United States Patent
Kim et al.

(10) Patent No.: US 12,381,649 B2
(45) Date of Patent: Aug. 5, 2025

(54) BLIND DECODING-BASED METHOD AND DEVICE FOR TRANSMITTING AND RECEIVING DOWNLINK CHANNEL IN WIRELESS COMMUNICATION SYSTEM

(71) Applicant: LG ELECTRONICS INC., Seoul (KR)

(72) Inventors: Hyungtae Kim, Seoul (KR); Suckchel Yang, Seoul (KR); Jiwon Kang, Seoul (KR); Seonwook Kim, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 406 days.

(21) Appl. No.: 17/914,290

(22) PCT Filed: Apr. 7, 2021

(86) PCT No.: PCT/KR2021/004347
§ 371 (c)(1),
(2) Date: Sep. 23, 2022

(87) PCT Pub. No.: WO2021/206446
PCT Pub. Date: Oct. 14, 2021

(65) Prior Publication Data
US 2023/0117189 A1 Apr. 20, 2023

(30) Foreign Application Priority Data

Apr. 7, 2020 (KR) .................. 10-2020-0042440
Dec. 30, 2020 (KR) .................. 10-2020-0187275

(51) Int. Cl.
*H04L 1/00* (2006.01)
*H04L 1/08* (2006.01)
(Continued)

(52) U.S. Cl.
CPC .............. *H04L 1/0038* (2013.01); *H04L 1/08* (2013.01); *H04W 24/08* (2013.01); *H04W 72/23* (2023.01)

(58) Field of Classification Search
CPC ... H04B 17/373; H04L 1/0038; H04L 1/0039; H04L 1/0045; H04L 1/0072; H04L 1/06;
(Continued)

(56) References Cited

U.S. PATENT DOCUMENTS 11,044,621 B2 * 6/2021 Hosseini ............... H04W 72/23
11,212,736 B2 * 12/2021 Xu ......................... H04W 48/12
(Continued)

FOREIGN PATENT DOCUMENTS

CN 109802758 A 5/2019
CN 110167036 A 8/2019
(Continued)

OTHER PUBLICATIONS

Intel Corporation, "On PDCCH enhancements for eURLLC", R1-1904305, 3GPP TSG RAN WG1 Meeting #96bis, Xi'an, China, Apr. 8-12, 2019, 10 pages, See p. 1-6.
(Continued)

*Primary Examiner* — Eric Nowlin
(74) *Attorney, Agent, or Firm* — BRYAN CAVE LEIGHTON PAISNER LLP

(57) ABSTRACT

Disclosed are a method and device for transmitting and receiving a downlink channel on the basis of blind decoding in a wireless communication system. A method for a terminal to decode a downlink channel in a wireless communication system according to an embodiment of the present disclosure comprises: a step for transmitting capability information associated with one or more first monitoring schemes among a plurality of monitoring scheme candidates to a base station; a configuration information reception step
(Continued)

for receiving configuration information about a second monitoring scheme among the plurality of monitoring scheme candidates from the base station, the complexity of the second monitoring scheme being no greater than that of the one or more first monitoring schemes; and a step for monitoring and decoding the downlink channel on the basis of the configuration information, wherein the plurality of monitoring scheme candidates may include a combined blind decoding (BD) scheme for the repeated transmission or split transmission of the downlink channel on a plurality of monitoring occasions (MO).

9 Claims, 19 Drawing Sheets

(51) Int. Cl.
*H04W 24/08* (2009.01)
*H04W 72/23* (2023.01)

(58) Field of Classification Search
CPC ....... H04L 1/08; H04L 1/1825; H04L 1/1861; H04L 1/1864; H04L 1/1893; H04L 5/0053; H04L 5/0094; H04L 2001/0093; H04W 8/24; H04W 24/08; H04W 72/23; H04W 72/232; Y02D 30/70
See application file for complete search history.

(56) References Cited

U.S. PATENT DOCUMENTS

| | | | | |
|---|---|---|---|---|
| 12,004,176 B2 * | 6/2024 | Khoshnevisan | ...... | H04L 5/0007 |
| 12,069,686 B2 * | 8/2024 | Khoshnevisan | ...... | H04L 5/0053 |
| 12,150,152 B2 * | 11/2024 | Park | ...... | H04L 5/0094 |
| 2013/0058240 A1 | 3/2013 | Kim et al. | | |
| 2014/0301341 A1 | 10/2014 | Pan | | |
| 2015/0181571 A1 | 6/2015 | Park et al. | | |
| 2019/0110279 A1 * | 4/2019 | Behravan | ............ | H04L 41/0803 |
| 2019/0150073 A1 * | 5/2019 | Tiirola | ............ | H04W 72/56 455/434 |
| 2019/0253308 A1 | 8/2019 | Huang et al. | | |
| 2019/0313321 A1 * | 10/2019 | Xu | ............ | H04L 5/0053 |
| 2020/0280971 A1 * | 9/2020 | Moon | ............ | H04L 5/0053 |
| 2020/0329389 A1 * | 10/2020 | Hosseini | ............ | H04W 72/0446 |
| 2021/0314927 A1 * | 10/2021 | Noh | ............ | H04L 5/0023 |
| 2022/0225301 A1 * | 7/2022 | Khoshnevisan | ...... | H04L 5/0094 |
| 2022/0417971 A1 * | 12/2022 | Vankayala | ............ | H04W 72/1273 |
| 2023/0033461 A1 * | 2/2023 | Khoshnevisan | ........ | H04L 5/001 |
| 2024/0032059 A1 * | 1/2024 | Liu | ............ | H04L 5/00 |

FOREIGN PATENT DOCUMENTS

| | | | | |
|---|---|---|---|---|
| CN | 110383729 A | | 10/2019 | |
| CN | 111937344 A | * | 11/2020 | ............ H04L 5/0053 |
| CN | 111937344 B | * | 3/2023 | ............ H04L 5/0053 |
| WO | 2011/126329 A2 | | 10/2011 | |
| WO | WO-2019195424 A1 | * | 10/2019 | ............ H04L 5/0053 |
| WO | WO-2023022398 A1 | * | 2/2023 | ............ H04L 1/001 |

OTHER PUBLICATIONS

Huawei, "Summary #4 of 7.2.6.1 PDCCH enhancements", R1-1913541, 3GPP TSG RAN WG1 Meeting #99, Reno, USA, Nov. 18-22, 2019, 63 pages, See p. 58.

* cited by examiner

BLIND DECODING-BASED METHOD AND DEVICE FOR TRANSMITTING AND RECEIVING DOWNLINK CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2021/004347, filed on Apr. 7, 2021, which claims the benefit of Korean Application No. 10-2020-0042440, filed on Apr. 7, 2020 and Korean Application No. 10-2020-0187275, filed on Dec. 30, 2020, the contents of which are all hereby incorporated by reference herein in their entirety.

TECHNICAL FIELD

The present disclosure relates to a wireless communication system, and in more detail, relates to a method and a device of transmitting or receiving a downlink channel based on blind decoding in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical problem of the present disclosure is to provide a method and a device of transmitting and receiving a downlink channel based on blind decoding in a wireless communication system.

An additional technical problem of the present disclosure is to provide a method and a device of transmitting and receiving a downlink channel based on a method of counting the number of blind decoding in a wireless communication system.

An additional technical problem of the present disclosure is to provide a method and a device of transmitting and receiving a downlink channel based on a blind decoding method or a monitoring method configured based on a terminal capability in a wireless communication system.

The technical objects to be achieved by the present disclosure are not limited to the above-described technical objects, and other technical objects which are not described herein will be clearly understood by those skilled in the pertinent art from the following description.

Technical Solution

A method of decoding a downlink channel by a terminal in a wireless communication system according to an aspect of the present disclosure may include transmitting to a base station capability information related to at least one first monitoring method among a plurality of monitoring method candidates; receiving from the base station configuration information for a second monitoring method among the plurality of monitoring method candidates, wherein a complexity of the second monitoring method is equal to or less than a complexity of the at least one first monitoring method; and performing monitoring and decoding for the downlink channel based on the configuration information, and the plurality of monitoring method candidates may include a combined blind decoding (BD) method for repetition transmission or division transmission of the downlink channel on a plurality of monitoring occasions (MOs).

A method of transmitting a downlink channel by a base station in a wireless communication system according to an additional aspect of the present disclosure may include receiving from a terminal capability information related to at least one first monitoring method among a plurality of monitoring method candidates; transmitting to the terminal configuration information for a second monitoring method among the plurality of monitoring method candidates, wherein a complexity of the second monitoring method is equal to or less than a complexity of the at least one first monitoring method; and transmitting the downlink channel to the terminal based on the configuration information and the plurality of monitoring method candidates may include a combined blind decoding (BD) method for repetition transmission or division transmission of the downlink channel on a plurality of monitoring occasions (MOs).

Technical Effects

According to an embodiment of the present disclosure, a method and a device of transmitting and receiving a downlink channel based on blind decoding in a wireless communication system may be provided.

According to an embodiment of the present disclosure, a method and a device of transmitting and receiving a downlink channel based on a method of counting the number of blind decoding in a wireless communication system may be provided.

According to an embodiment of the present disclosure, a method and a device of transmitting and receiving a downlink channel based on a blind decoding method or a monitoring method configured based on a terminal capability in a wireless communication system may be provided.

According to an embodiment of the present disclosure, based on a downlink control channel transmitted from MTRPs, even when TCI information is not included in a downlink control channel, TCI associated with a downlink signal transmitted from MTRPs or a STRP may be clearly configured or determined.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
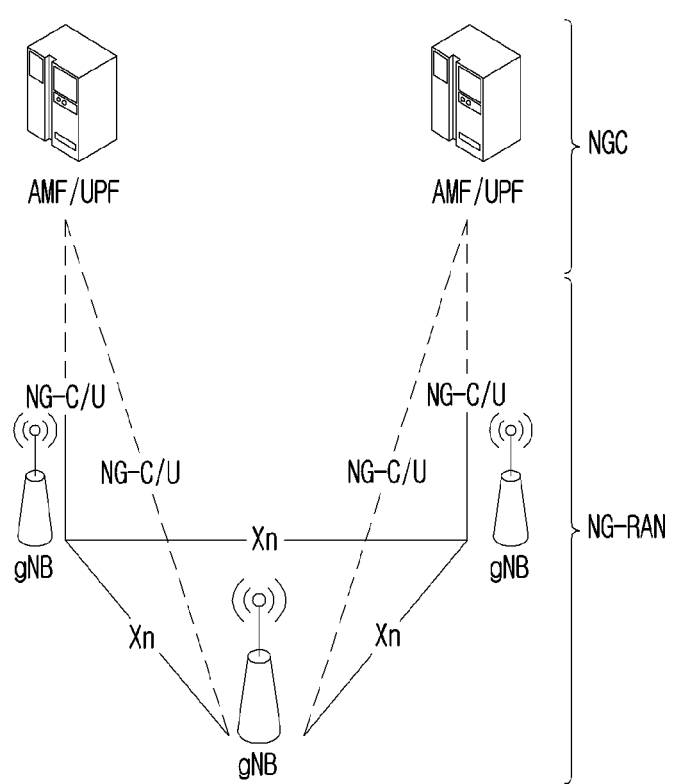
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
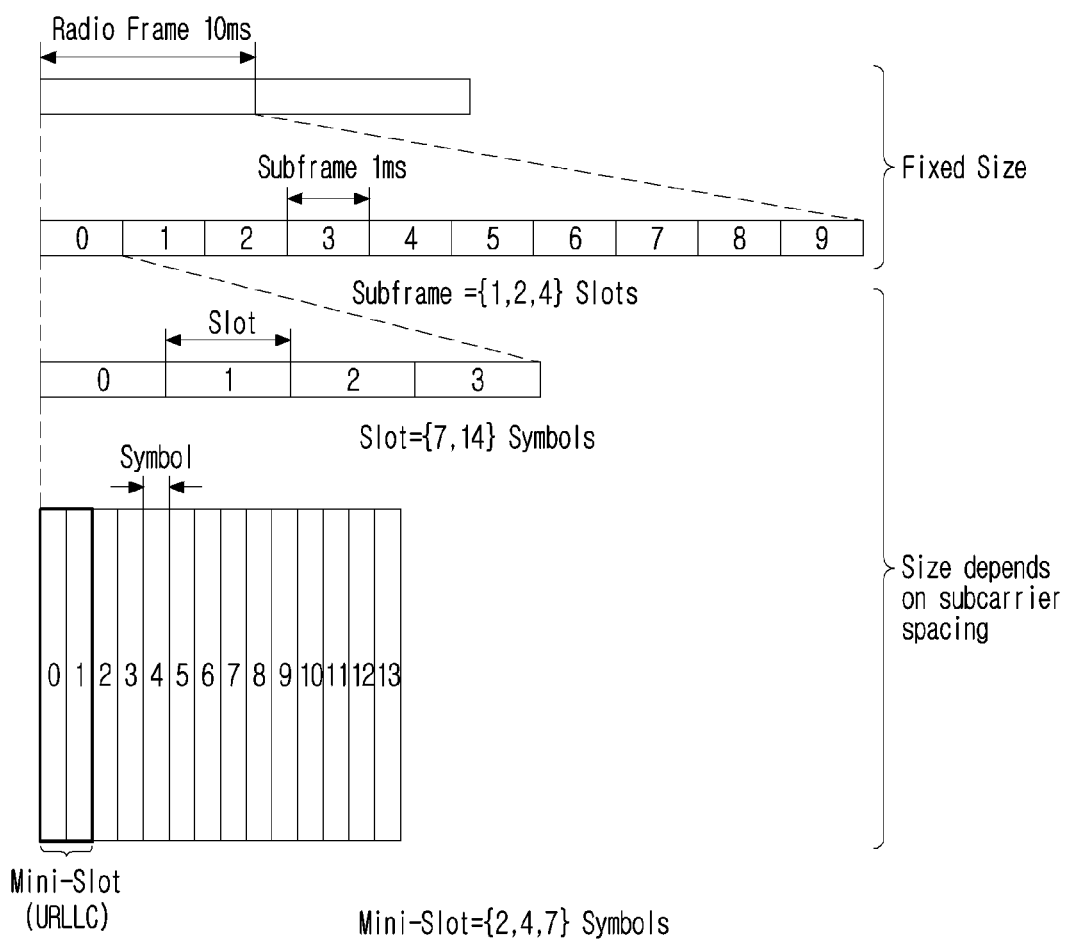
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
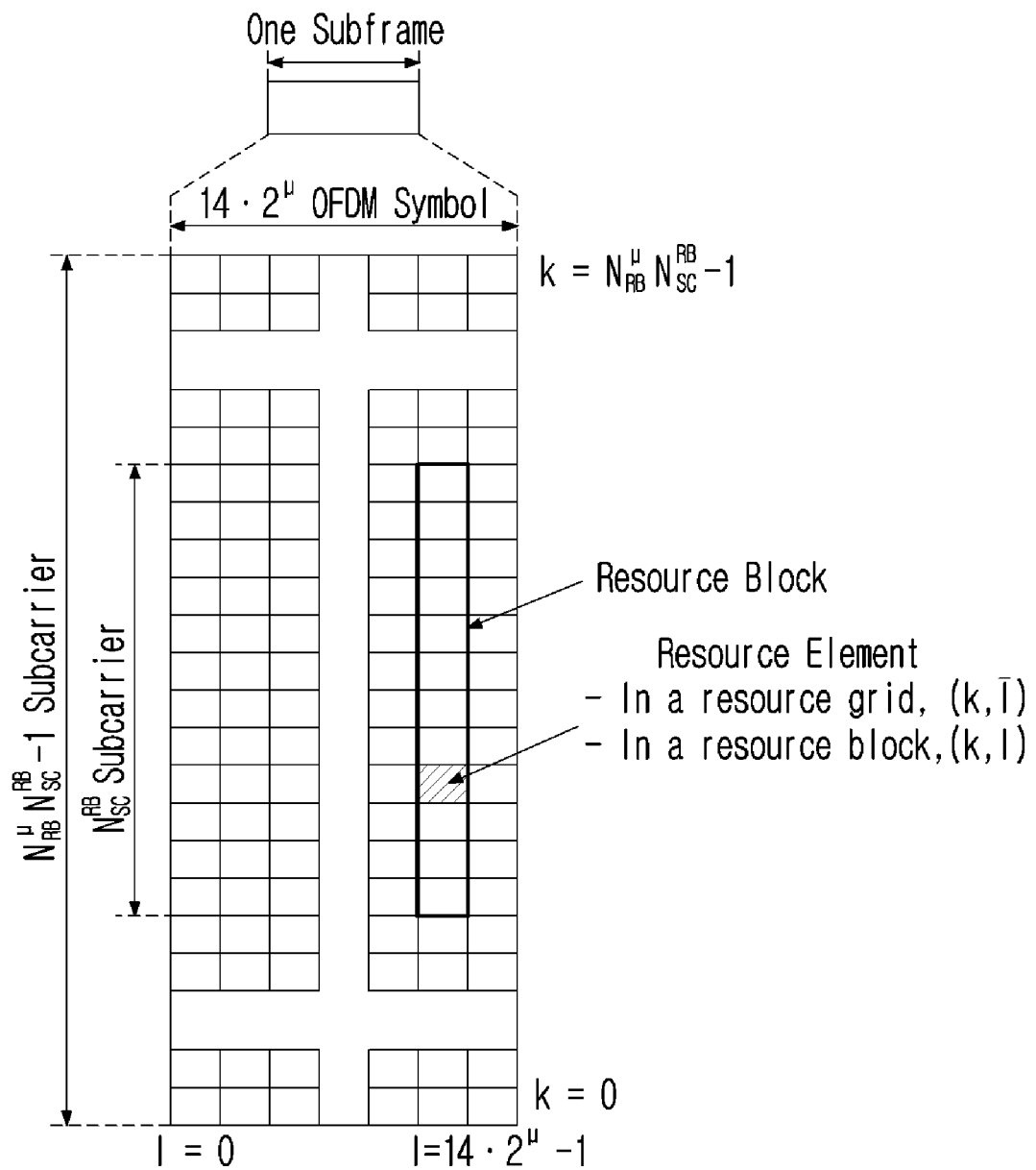
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k,l'). Here, k=0, ..., $N_{RB}^\mu N_{sc}^{RB}-1$ is an index in a frequency domain and l'=0, ..., $2^\mu N_{symb}^{(\mu)}-1$ refers to a position of a symbol in a subframe. When referring to a resource element in a slot, an index pair (k,l) is used. Here, l=0, ..., $N_{symb}^\mu-1$. A resource element (k,l') for p and an antenna port p corresponds to a complex value, $a_{k,l'}^{(p,\mu)}$.

When there is no risk of confusion or when a specific antenna port or numerology is not specified, indexes p and μ may be dropped, whereupon a complex value may be $a_{k,l}^{(p)}$ or $a_{k,l}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration p is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu} \qquad \text{[Equation 2]}$$

$N_{BWP,i}^{start,\mu}$ is a common resource block that a BWP starts relatively to common resource block 0.

Figure 4:
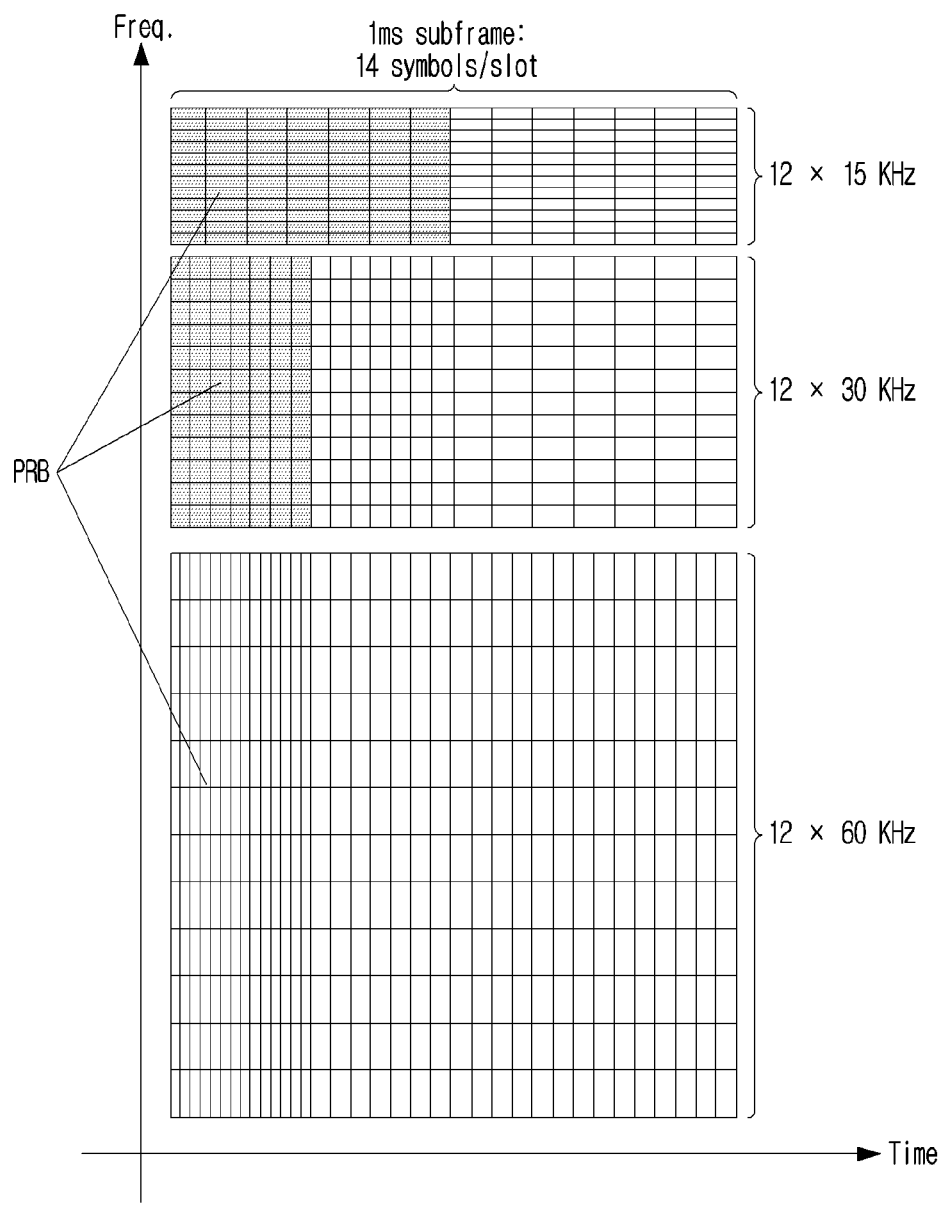
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
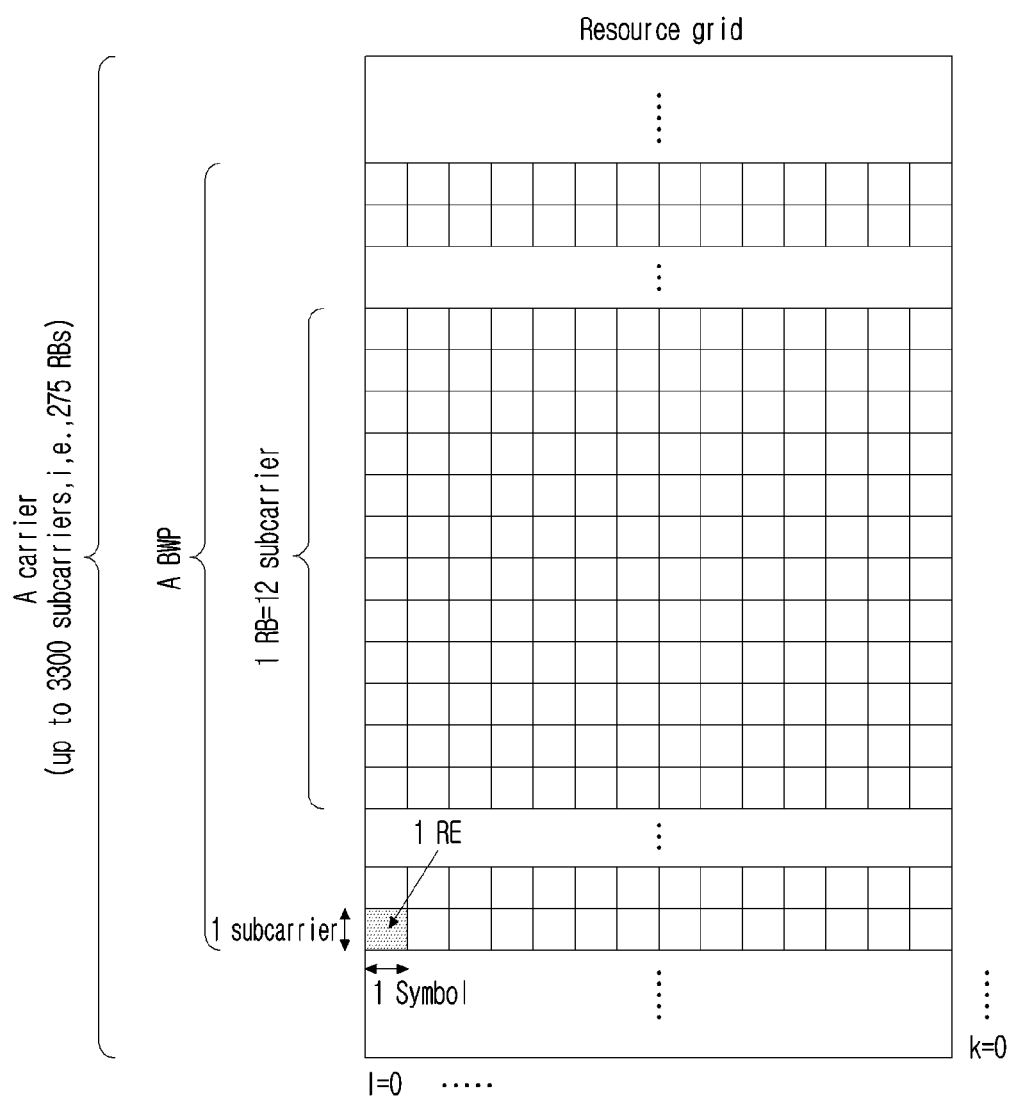
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP (s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
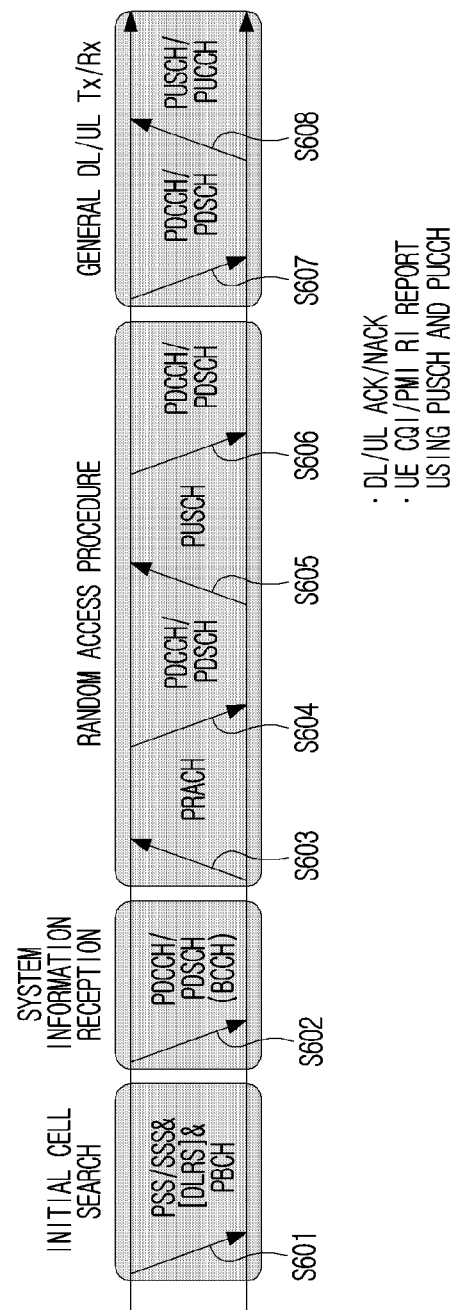
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)—PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
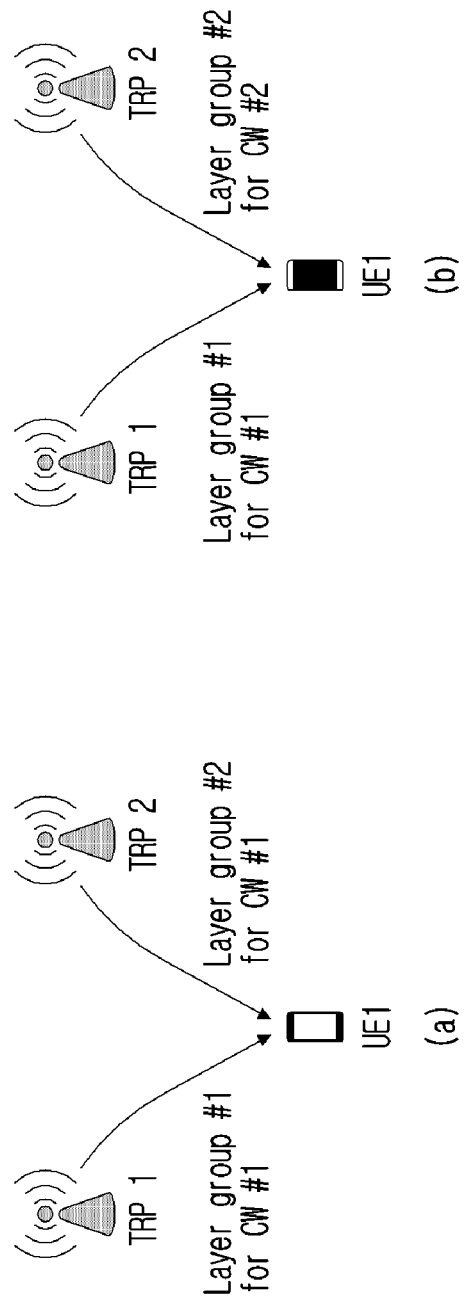
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(*a*), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to methods illustrated in FIG. 7(*a*) and FIG. 7(*b*) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following method is discussed.

1) Method 1 (SDM): Time and frequency resource allocation is overlapped and n (n<=Ns) TCI states in a single slot 1-a) Method 1a The same TB is transmitted in one layer or layer set at each transmission time (occasion) and each layer or each layer set is associated with one TCI and one set of DMRS port (s).

A single codeword having one RV is used in all spatial layers or all layer sets. With regard to UE, different coded bits are mapped to a different layer or layer set by using the same mapping rule.

1-b) Method 1b

The same TB is transmitted in one layer or layer set at each transmission time (occasion) and each layer or each layer set is associated with one TCI and one set of DMRS port (s).

A single codeword having one RV is used in each spatial layer or each layer set. RV (s) corresponding to each spatial layer or each layer set may be the same or different.

1-c) Method 1c

At one transmission time (occasion), the same TB having one DMRS port associated with multiple TCI state indexes is transmitted in one layer or the same TB having multiple DMRS ports one-to-one associated with multiple TCI state indexes is transmitted in one layer.

In case of the method 1a and 1c, the same MCS is applied to all layers or all layer sets.

2) Method 2 (FDM): Frequency resource allocation is not overlapped and n (n<=Nf) TCI states in a single slot Each non-overlapping frequency resource allocation is associated with one TCI state.

The same single/multiple DMRS port (s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the method 2a, the same MCS is applied to all non-overlapping frequency resource allocation.

3) Method 3 (TDM): Time resource allocation is not overlapped and n (n<=Nt1) TCI states in a single slot Each transmission time (occasion) of a TB has time granularity of a mini-slot and has one TCI and one RV.

A common MCS is used with a single or multiple DMRS port (s) at every transmission time (occasion) in a slot.

A RV/TCI may be the same or different at a different transmission time (occasion).

4) Method 4 (TDM): n (n<=Nt2) TCI states in K (n<=K) different slots

Each transmission time (occasion) of a TB has one TCI and one RV.

Every transmission time (occasion) across K slots uses a common MCS with a single or multiple DMRS port(s).

A RV/TCI may be the same or different at a different transmission time (occasion).

Hereinafter, MTRP URLLC is described.

In the present disclosure, DL MTRP URLLC means that multiple TRPS transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 to share received data/DCI through a backhaul link connected between TRPs. UE configured with a UL MTRP-URLLC transmission method transmits the same data/UCI by using a different layer/time/frequency resource. In this case, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and may configure spatial relation information, etc. to UE through other parameter, instead of a TCI state. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurements per cell), 1: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, UE may figure out whether of MTRP URLLC transmission/reception or MTRP eMBB transmission/reception by separately dividing a RNTI for MTRP-URLLC and a RNTI for MTRP-eMBB and using them. In other words, when CRC masking of DCI is performed by using a RNTI for URLLC, UE considers it as URLLC transmission and when CRC masking of DCI is performed by using a RNTI for eMBB, UE considers it as eMBB transmission. Alternatively, a base station may configure MTRP URLLC transmission/reception or TRP eMBB transmission/reception to UE through other new signaling.

In a description of the present disclosure, it is described by assuming cooperative transmission/reception between 2 TRPs for convenience of a description, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.

Hereinafter, methods proposed in the present disclosure may be utilized in a situation that MTRPs cooperatively transmit a PDCCH (repetitively transmit or partitively transmit the same PDCCH). In addition, methods proposed in the present disclosure may be also utilized in a situation that MTRPs cooperatively transmit a PDSCH or cooperatively receive a PUSCH/a PUCCH.

In addition, in the present disclosure, when a plurality of base stations (i.e., MTRPs) repetitively transmit the same PDCCH, it may mean the same DCI is transmitted through multiple PDCCH candidates and it may also mean that a plurality of base stations repetitively transmit the same DCI. Here, the same DCI may mean two DCI with the same DCI format/size/payload. Alternatively, although two DCI has a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception occasion of DCI, so if DCI received at n occasions and DCI received at n+1 occasions inform UE of the same scheduling result, a TDRA field of two DCI is different and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of the other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRPs) partitively transmit the same PDCCH, it means that one DCI is transmitted through one PDCCH candidate, but TRP 1 transmits some resources that such a PDCCH candidate is defined and TRP 2 transmits the remaining resources. For example, when a PDCCH candidate corresponding to aggregation level m1+m2 is partitively transmitted by TRP 1 and TRP 2, a PDCCH candidate may be divided into PDCCH candidate 1 corresponding to aggregation level m1 and PDCCH candidate 2 corresponding to aggregation level m2, and TRP 1 may transmit PDCCH candidate 1 and TRP 2 may transmit PDCCH candidate 2 to a different time/frequency resource. After receiving PDCCH candidate 1 and PDCCH candidate 2, UE may generate a PDCCH candidate corresponding to aggregation level m1+m2 and try DCI decoding.

In addition, in the present disclosure, when UE repetitively transmits the same PUSCH so that a plurality of base stations (i.e., MTRPs) can receive it, it may mean that UE transmitted the same data through multiple PUSCHs. In this case, each PUSCH may be optimized and transmitted to an UL channel of a different TRP. For example, when UE repetitively transmits the same data through PUSCH 1 and 2, PUSCH 1 is transmitted by using UL TCI state 1 for TRP 1 and in this case, link adaptation such as a precoder/MCS, etc. may be also scheduled/applied to a value optimized for a channel of TRP 1. PUSCH 2 is transmitted by using UL TCI state 2 for TRP 2 and link adaptation such as a precoder/MCS, etc. may be also scheduled/applied to a value optimized for a channel of TRP 2. In this case, PUSCH 1 and 2 which are repetitively transmitted may be transmitted at a different time to be TDM, FDM or SDM.

In addition, in the present disclosure, when UE partitively transmits the same PUSCH so that a plurality of base stations (i.e., MTRPs) can receive it, it may mean that UE transmits one data through one PUSCH, but it divides resources allocated to that PUSCH, optimizes them for an UL channel of a different TRP and transmits them. For example, when UE transmits the same data through 10 symbol PUSCHs, data is transmitted by using UL TCI state 1 for TRP 1 in 5 previous symbols and in this case, link adaptation such as a precoder/MCS, etc. may be also scheduled/applied to a value optimized for a channel of TRP 1. The remaining data is transmitted by using UL TCI state 2 for TRP 2 in the remaining 5 symbols and in this case, link adaptation such as a precoder/MCS, etc. may be also scheduled/applied to a value optimized for a channel of TRP 2. In the example, transmission for TRP 1 and transmission for TRP 2 are TDM-ed by dividing one PUSCH into time resources, but it may be transmitted by a FDM/SDM method.

In addition, similarly to the above-described PUSCH transmission, also for a PUCCH, UE may repetitively transmit the same PUCCH or may partitively transmit the same PUCCH so that a plurality of base stations (i.e., MTRPs) receive it.

Hereinafter, a proposal of the present disclosure may be extended and applied to a variety of channels such as a PUSCH/a PUCCH/a PDSCH/a PDCCH, etc.

A proposal of the present disclosure may be extended and applied to both a case in which various uplink/downlink channels are repetitively transmitted to a different time/frequency/space resource and a case in which various uplink/downlink channels are partitively transmitted to a different time/frequency/space resource.

Control Resource Set (CORESET)

A predetermined resource used for monitoring a downlink control channel (e.g., a PDCCH) may be defined based on a control channel element (CCE), a resource element group (REG) and a control resource set (CORESET). In addition, the predetermined resource may be defined as a resource which is not used for a DMRS associated with a downlink control channel.

A CORESET corresponds to a time-frequency resource which tries decoding of a control channel candidate by using one or more search spaces (SS). For example, a CORESET is defined as a resource that a terminal may receive a PDCCH and a base station does not necessarily transmit a PDCCH in a CORESET.

In a time-frequency domain, a size and a position of a CORESET may be configured semi-statically by a network. In a time domain, a CORESET may be positioned in any symbol in a slot. For example, a time length of a CORESET may be defined as up to 2 or 3 symbol durations. In a frequency domain, a CORESET may be positioned at a position of any frequency in an active bandwidth part (BWP) within a carrier bandwidth. A frequency size of a CORESET may be defined as a multiple of 6 RB units in a carrier bandwidth (e.g., 400 MHz) or less. A time-frequency position and size of a CORESET may be configured by RRC signaling.

A first CORESET (or CORESET 0) may be configured by a master information block (MIB) provided through a PBCH. A MIB may be obtained by a terminal from a network at an initial access step and a terminal may monitor a PDCCH including information scheduling system information block1 (SIB1) in CORESET 0 configured by a MIB. After a terminal is configured for connection, one or more CORESETs may be additionally configured through RRC signaling. An identifier may be allocated to each of a plurality of CORESETs. A plurality of CORESETs may be overlapped each other.

A PDSCH in a slot may be also positioned before starting or after ending a PDCCH in a CORESET. In addition, an unused CORESET resource may be reused for a PDSCH. For it, a reserved resource is defined, which may be overlapped with a CORESET. For example, one or more reserved resource candidates may be configured and each of reserved resource candidates may be configured by a bitmap in a time resource unit and a bitmap in a frequency resource unit. Whether a configured reserved resource candidate is activated (or whether it may be used for a PDSCH) may be dynamically indicated or may be semi-statically configured through DCI.

One CCE-to-REG mapping relationship may be defined for each CORESET. Here, one REG is a unit corresponding to one OFDM symbol and one RB (i.e., 12 subcarriers). One CCE may correspond to 6 REGs. A CCE-to-REG mapping relationship of a different CORESET may be the same or may be configured differently. A mapping relationship may be defined in a unit of a REG bundle. A REG bundle may correspond to a set of REG (s) that a terminal assumes consistent precoding will be applied. CCE-to-REG mapping may include or may not include interleaving. For example, when interleaving is not applied, a REG bundle configured with 6 consecutive REGs may form one CCE. When interleaving is applied, a size of a REG bundle may be 2 or 6 when a time duration length of a CORESET is 1 or 2 OFDM symbols and a size of a REG bundle may be 3 or 6 when a time duration length of a CORESET is 3 OFDM symbols. A block interleaver may be applied so that a different REG bundle will be dispersed in a frequency domain and mapped to a CCE. The number of rows of a block interleaver may be variably configured for a variety of frequency diversities.

In order for a terminal to receive a PDCCH, channel estimation using a PDCCH DMRS may be performed. A PDCCH may use one antenna port (e.g., antenna port index 2000). A PDCCH DMRS sequence is generated across the entire common resource block in a frequency domain, but it may be transmitted only in a resource block that an associated PDCCH is transmitted. Meanwhile, before a terminal obtains system information in an initial access process, a position of a common resource block may not be known, so for CORESET 0 configured by a MIB provided through a PBCH, a PDCCH DMRS sequence may be generated from a first resource block of CORESET 0. A PDCCH DMRS may be mapped to every fourth subcarrier in a REG. A terminal may perform channel estimation in a unit of a REG bundle by using a PDCCH DMRS.

Search Space (SS)

DCI in various formats or in various sizes may be used in PDCCH transmission and a terminal may perform blind detection or blind decoding for DCI by monitoring a PDCCH candidate based on a predetermined DCI format. A different DCI format may not necessarily have a different DCI size. Search space (SS) may be defined to limit the number of PDCCH candidates which should be monitored by a terminal.

Search space may be a set of control channel candidates corresponding to CCE (s) according to a predetermined aggregation level. For example, an aggregation level may be defined as 1, 2, 4, 8 or 16 and a PDCCH may be configured with a set of CCE (s) corresponding to an aggregation level. One or more CORESETs may be configured for a terminal and one or more search space may be configured for each CORESET. The number of PDCCH candidates may be configured per search space or per aggregation level.

Search space may include terminal-specific search space and common search space shared by multiple terminals. In terminal-specific search space, a terminal may try decoding of a PDCCH candidate based on a terminal-specific identifier (e.g., a C-RNTI). In common search space, a terminal may try decoding of a PDCCH candidate based on an identifier for a specific purpose (e.g., a SI (System Information)—RNTI, a P (Paging)—RNTI, a RA (Random Access)—RNTI, etc.), not a unique identifier. A CCE set for common search space may be predefined.

A terminal may try decoding of a PDCCH candidate for corresponding search space at a monitoring occasion (MO) configured for search space. In trying decoding of a PDCCH candidate, a terminal may process information transmitted through a PDCCH when it succeeds in CRC check based on an available RNTI, and it may ignore it by determining that it is information which is intended by other terminal or that an error exists when it fails in CRC check.

One search space (SS) may correspond to one monitoring occasion (MO) and one search space set (SS set) may correspond to a set of MOs. In addition, one SS set may define a time position that a CORESET associated with it exists (e.g., a period and/or an offset). In other words, a terminal may perform blind decoding for a PDCCH in a CORESET existing based on a period/an offset corresponding to a SS set. For example, MO 1 may exist repetitively in a period corresponding to SS set 1 and MO 2 may exist repetitively in a period corresponding to SS set 2. In addition, one CORESET may be associated with one or more (e.g., up to 10) SS sets, but one SS set may be associated only with one CORESET.

In addition, a CORESET is defined as a predetermined time-frequency resource in one time unit (e.g., a slot) and a space parameter (e.g., a TCI state, or a QCL RS) may be configured for each CORESET.

Downlink Channel Blind Decoding (BD)

As described above, a terminal may perform blind decoding for a downlink channel (e.g., a PDCCH). Regarding blind decoding (BD), a limit to one or more of the number of BD or the number of CCEs in a predetermined time unit (e.g., one slot) may be configured. Such a limit may be associated with a terminal capability (e.g., processing speed). When the number of BD/CCEs counted by a terminal exceeds a limit, some SS sets may be dropped. In other words, a terminal may not try PDCCH monitoring/detection/blind decoding in a CORESET corresponding to the some SS sets.

For downlink transmission from MTRPs or a STRP, repetition transmission or division transmission of a PDCCH may be supported. In other words, the same PDCCH (or the same DCI) may be repetitively (or partitively) transmitted across multiple time-frequency resources. In this case, for a PDCCH BD operation, a problem occurs in which a standard for counting the number of BD/CCEs is ambiguous and accordingly, a problem may occur in which application of a limit to the number of BD/CCEs is also ambiguous. In the present disclosure, various examples for solving such a problem are described.

Figure 8:
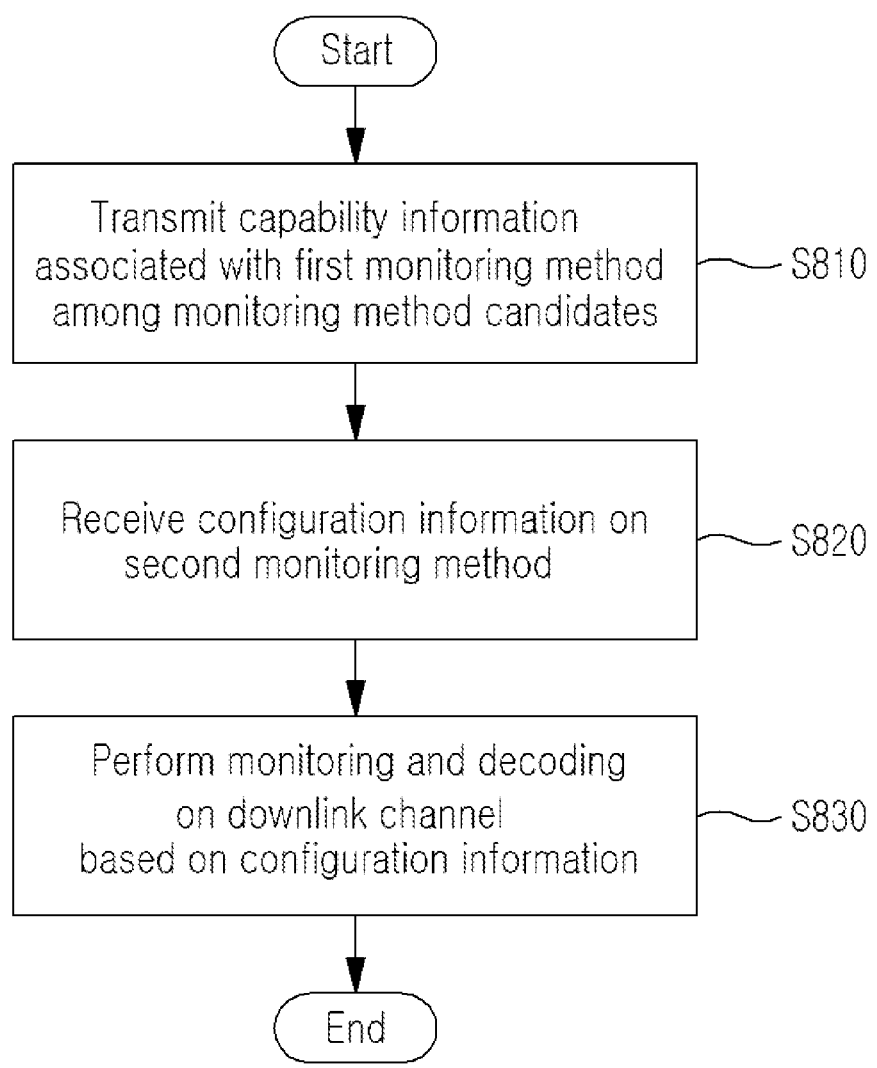
FIG. 8 is a flow chart for describing a blind decoding based method of receiving a downlink channel according to an embodiment of the present disclosure.

FIG. 8 is a flow chart for describing a blind decoding based method of receiving a downlink channel according to an embodiment of the present disclosure.

In S810, a terminal may transmit to a base station terminal capability information associated with a first monitoring method among monitoring method candidates.

For example, a monitoring method may be associated with a method of counting the number of BD/CCEs for a downlink channel (e.g., a PDCCH). In addition, a monitoring method may be associated with the number of BD/CCEs in one time unit (e.g., a slot). In addition, a terminal capability may be associated with a limit to the number of BD/CCEs in one time unit.

One or more monitoring method candidates may be predefined between a terminal and a base station (without separate signaling) or may be configured by a base station to a terminal.

For example, monitoring method candidates may be related to whether a downlink channel is repetitively/partitively transmitted. For example, monitoring method candidates may be defined based on an assumption that one downlink channel to which repetition/division transmission is not applied (i.e., transmitted 1 time) is decoded individually, or all downlink channels which are repetitively/partitively transmitted are combined and decoded. In addition, monitoring method candidates may be defined based on the number of repetition/division transmission, a control information format (e.g., a DCI format), a priority between repetition/division transmission and one-time transmission, etc.

In addition, a terminal may report one or a plurality of first monitoring methods.

In S820, a terminal may receive configuration information on a second monitoring method from a base station.

For example, a second monitoring method may be a monitoring method having complexity equal to or less than complexity of a first monitoring method. Here, complexity may be associated with the number of BD/CCEs. For example, a second monitoring method may be the same as a first monitoring method or may be a different monitoring method having complexity lower than a first monitoring method. In addition, a second monitoring method may be also included in the one or more monitoring method candidates.

In S830, a terminal may monitor candidates of a downlink channel based on a configured monitoring method and perform decoding for a downlink channel.

For example, for a downlink channel detected based on a monitoring method, a terminal may individually decode one downlink channel detected at one MO or may perform decoding by combining a downlink channel detected at a plurality of MOs.

For example, based on a limit to the number of BD/CCEs associated with a monitoring method and the number of BD/CCEs associated with a terminal capability, some SS or SS sets may be dropped. For example, a terminal may not perform downlink channel monitoring/detection in a SS set or SS associated with BD/a CCE exceeding a limit.

Hereinafter, various examples according to the present disclosure are described. In the following description, it is described by presenting a PDCCH as a representative example of a downlink channel subject to blind decoding, but a scope of the present disclosure is not limited thereto and the following examples may be applied to a variety of downlink channels to which blind decoding may be applied.

Embodiment 1

When a base station prefers PDCCH reliability to efficiency of resource use, the same PDCCH (or the same DCI) may be repetitively (or partitively) transmitted to multiple time/frequency resources. Alternatively, when a base station prefers efficiency of resource use to PDCCH reliability, a PDCCH may be transmitted without repetition/division.

Figure 9:
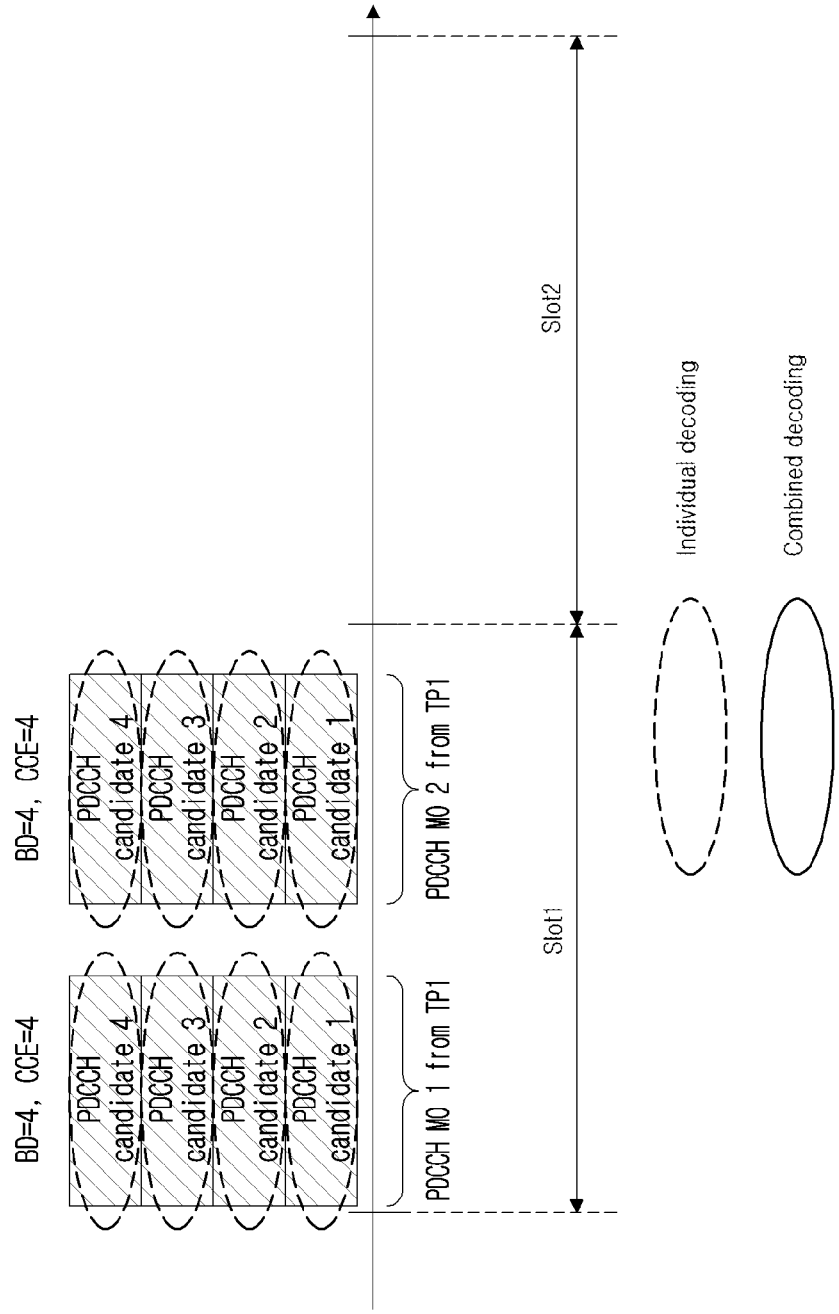
FIG. 9 is a diagram for describing the number of PDCCH BD/CCEs to which the present disclosure may be applied.

FIG. 9 is a diagram for describing the number of PDCCH BD/CCEs to which the present disclosure may be applied.

An example of FIG. 9 may correspond to a BD operation for a PDCCH transmitted without repetition/division from one TP (or a base station, a TRP, a cell, a panel, etc.) (e.g., TP1).

In addition, in examples of the present disclosure, for clarity of a description, it is assumed that an aggregation level (AL) of a PDCCH candidate is 1 (i.e., one PDCCH candidate is configured with one CCE).

In addition, in examples of the present disclosure, for clarity of a description, it is assumed that there are 2 or more MOs in one time unit (e.g., a slot). An example of FIG. 9 represents a case in which there are 2 MOs in one time unit. Each MO may correspond to a SS set. For example, MO1 may appear repetitively according to a period/an offset of SS set 1 and MO2 may appear repetitively according to a period/an offset of SS set 2.

In addition, in examples of the present disclosure, for clarity of a description, it is assumed that there are 4 SS/PDCCH candidates in one SS set/MO. In addition, it is assumed that one DCI format may be transmitted to each PDCCH candidate.

In addition, in examples of the present disclosure, a different MO/SS set may be associated with a different TP index or may be associated with the same TP index. In addition, which TP is associated with each MO/SS set may be indicated/configured to a terminal or may be transparent for a terminal.

In other words, in order to clearly describe the principle of the present disclosure, a simple situation is assumed for an AL, the number of MOs per time unit, the number of SS sets per time unit, the number of SS per SS set, the number of DCI formats per PDCCH candidate and a TP index associated with a SS set/a MO, but a scope of the present disclosure is not limited thereto, and includes a case in which different values are applied to an AL, the number of MOs per time unit, the number of SS sets per time unit, the number of SS per SS set, the number of DCI formats per PDCCH candidate and a TP index associated with a SS set/a MO.

In an example of FIG. 9, a terminal may perform channel estimation and BD for each of PDCCH candidate 1, 2, 3, 4 at MO1. As a result, it may perform BD 4 times and may perform channel estimation for 4 CCEs at MO1. Similarly, a terminal may perform channel estimation and BD for each of PDCCH candidate 1, 2, 3, 4 at MO2. As a result, it may perform BD 4 times and may perform channel estimation for 4 CCEs at MO2. In other words, in an example of FIG. 9, a terminal may perform one BD (i.e., individual decoding) for each PDCCH candidate at each MO.

Meanwhile, when the same PDCCH (or the same DCI) is repetitively/partitively transmitted to multiple time/frequency resources, a terminal may determine the number of BD/CCEs in a manner different from a PDCCH BD operation in FIG. 9.

A terminal may determine the number of BD/CCEs configured for PDCCH monitoring/detection/decoding in one time unit (e.g., a slot) and determine whether that value exceeds a BD/CCE limit. When the number of BD/CCEs determined according to a monitoring method exceeds a BD/CCE limit, some SS sets may be dropped according to a predetermined priority (i.e., monitoring for a PDCCH candidate corresponding to some SS sets may be skipped). With this regard, a terminal may determine the number of BD/CCEs according to various examples of the present disclosure.

A BD/CCE limit may be defined per predetermined time unit (e.g., a slot).

If MO1 and MO2 are positioned in a different slot, whether a BD/CCE limit is exceeded (or overbooked) and/or whether a SS set is dropped (or monitoring is skipped) may be determined by considering the number of BD/CCEs for MO1 and (if any) the number of BD/CCEs of other SS set configured in the same slot as MO1 together. Similarly, whether a BD/CCE limit is exceeded (or overbooked) and/or whether a SS set is dropped (or monitoring is skipped) may be determined by considering the number of BD/CCEs for MO2 and (if any) the number of BD/CCEs of other SS set configured in the same slot as MO2 together.

If MO1 and MO2 are positioned in the same slot, whether a BD/CCE limit is exceeded (or overbooked) and/or whether a SS set is dropped (or monitoring is skipped) may be determined by considering the number of BD/CCEs at MO1, the number of BD/CCEs at MO2 and (if any) the number of BD/CCEs of other SS set configured in the same slot as MO1 and MO2 together.

Embodiment 1-1

Figure 10:
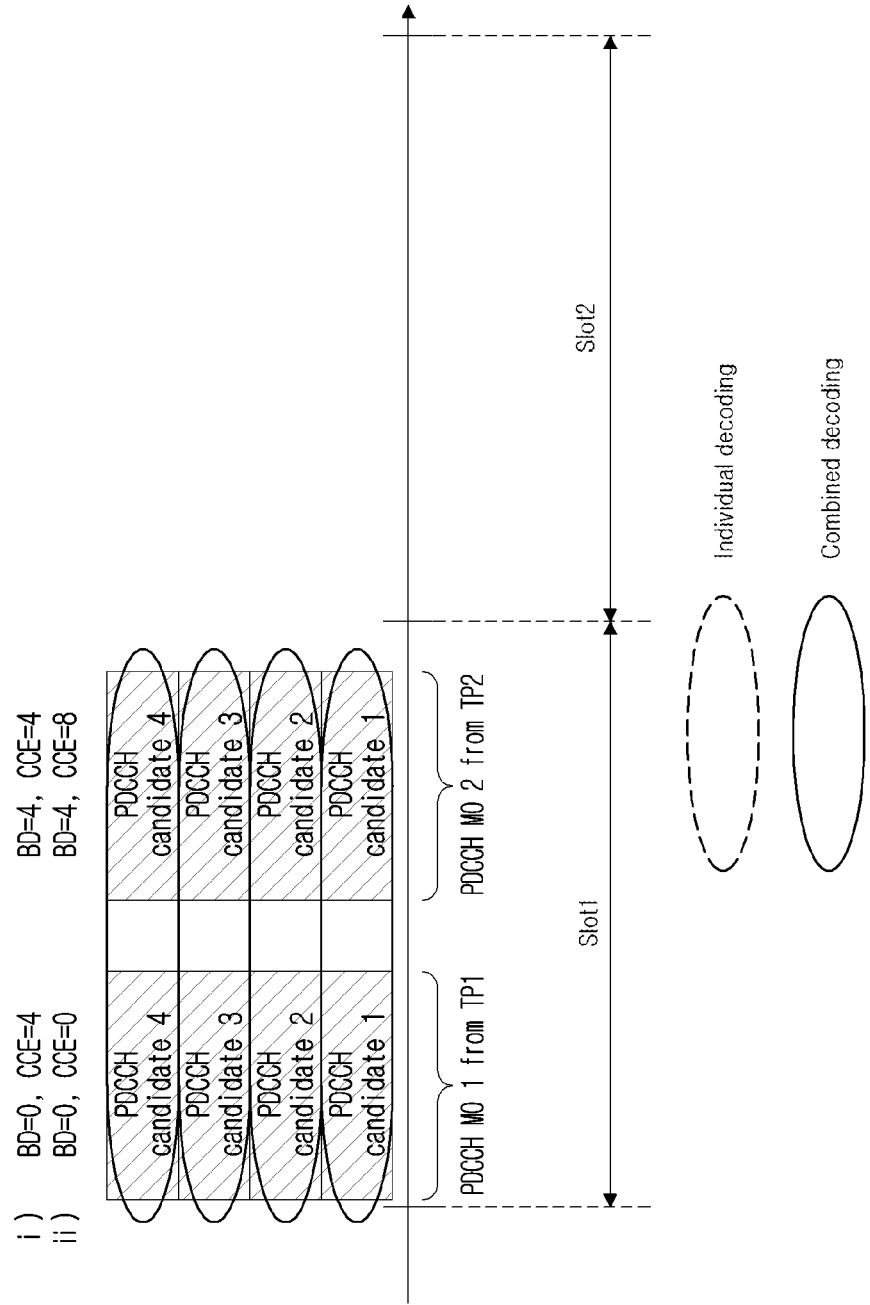
FIG. 10 to FIG. 17 are diagrams for describing the number of PDCCH BD/CCEs according to embodiments of the present disclosure.

FIG. 10 is a diagram for describing the number of PDCCH BD/CCEs according to an embodiment of the present disclosure.

FIG. 10 may correspond to an example on a BD operation for a PDCCH which is repetitively/partitively transmitted from a plurality of TPs (or base stations, TRPs, cells, panels, etc.) (e.g., TP1 and TP2).

Similar to an example of FIG. 9, also in an example of FIG. 10, for clarity of a description, it is assumed that an AL for a PDCCH candidate is 1, there are 2 SS sets/MOs in one time unit (e.g., a slot), there are 4 PDCCH candidates in each SS set/MO and one DCI format may be transmitted to each PDCCH candidate.

Unlike an example of FIG. 9, in an example of FIG. 10, it is assumed that MO1 is associated with TP1 and MO2 is associated with TP2. For example, a RS transmitted from TP1 as a QCL RS of a PDCCH DMRS (e.g., a SSB/a CSI-RS/a TRS, etc.) may be configured for a terminal at MO1 and a RS transmitted from TP2 as a QCL RS of a PDCCH DMRS (e.g., a SSB/a CSI-RS/a TRS, etc.) may be configured for a terminal at MO2. In other words, it is assumed that a PDCCH is received from TP index i in MO index i.

In addition, the same PDCCH may be TDM-ed and repetitively/partitively transmitted at a different MO. It is assumed that PDCCH candidate n transmitted by TP1 at MO1 and PDCCH candidate n transmitted by TP2 at MO2 may be paired and used for repetition/division transmission (in an example of FIG. 10, n=1, 2, 3, 4).

As a terminal knows that PDCCH candidate n at MO1 and PDCCH candidate n at MO2 are used for the same PDCCH transmission (based on a configuration from a base station), it may receive PDCCH candidate n detected at MO1 and PDCCH candidate n detected at MO2 and combine them to perform BD one time.

In this case, BD is not performed (i.e., the number of BD is 0) and channel estimation for 4 CCEs is performed at MO1 and BD may be performed 4 times and channel estimation for 4 CCEs may be performed at MO2.

In embodiment 1-1, a monitoring method is assumed that a terminal does not perform BD for each of PDCCH candidates which are repetitively/partitively transmitted and performs BD one time after receiving all PDCCH candidates which are repetitively/partitively transmitted. Accordingly, BD complexity of a terminal may be reduced. In other words, when the same PDCCH is repetitively/partitively transmitted through a plurality of PDCCH candidates belonging to a different MO, BD (i.e., combined decoding) may be performed one time after all PDCCHs which are repetitively/partitively transmitted are received (i.e., after a PDCCH is received at a last MO).

A terminal may perform channel estimation based on a PDCCH DMRS at each MO. In an example of FIG. 10, the number of CCEs representing the amount of channel estimation calculation may be counted by 4 per each MO. For example, UE may store a channel estimated at MO1 in a buffer and use this value when performing BD at MO2. In other words, as in an example of FIG. 10, channel estimation for CCE=4 may be performed at MO1 and channel estimation for CCE=4 may be performed at MO2.

Alternatively, CCE channel estimation may not be performed at a MO that BD is not performed and CCE channel estimation may be performed together at a MO that BD is performed. For example, UE may perform both channel estimation of MO1 and MO2 at MO2 without performing channel estimation at MO1. In this case, CCE may become 0 at MO1 and CCE may become 8 at MO2.

As such, when combined decoding is applied, i) CCE channel estimation may be performed at each MO independently/regardless of whether BD is performed, or ii) CCE channel estimation may not be performed at a MO that BD is not performed and CCE channel estimation may be performed at a MO that BD is performed.

With this regard, a terminal may report to a base station (i.e., report a terminal capability) which method is preferred/supported out of i) or ii) method for counting the number of CCEs. A base station may configure a method supported by a base station to a terminal by considering a terminal capability. Alternatively, a base station may configure/indicate a method of counting the number of CCEs to a terminal without reporting a terminal capability.

Figure 11:
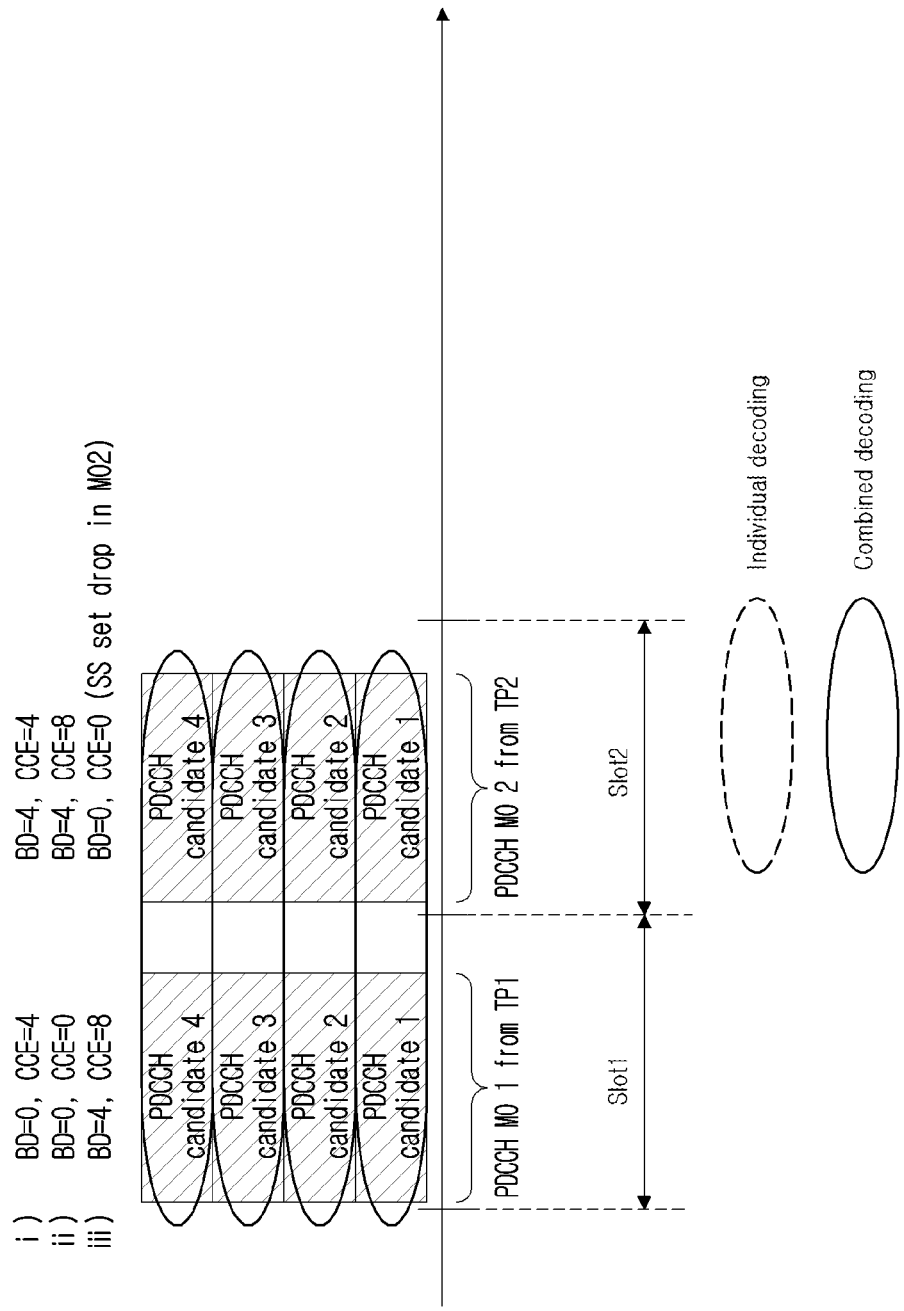

FIG. 11 is a diagram for describing the number of PDCCH BD/CCEs according to an embodiment of the present disclosure.

An example of FIG. 10 represents that MO1 and MO2 are positioned in the same slot, but contrary to it, as in an example of FIG. 11, MO1 and MO2 may be positioned in a different slot. In an example of FIG. 11, other assumptions are the same as in an example of FIG. 10.

When it is fixedly configured that combined decoding is performed at a later MO (e.g., MO2) in a time domain, PDCCH overbooking may occur at MO2 (due to existence of other SS set). When some SS sets are dropped due to PDCCH overbooking at MO2, a PDCCH transmission and reception occasion may be lost both at MO1 and MO2. Specifically, a terminal may determine whether PDCCH overbooking is performed by comparing the number of BD/CCEs counted in a slot to which MO2 belongs with a BD/CCE limit and for overbooking, a SS set having a lower priority may be dropped based on a SS set priority. To prevent such a problem, it may be configured to perform combined decoding for PDCCH transmission and reception at MO1.

For example, a MO that combined decoding is performed may be determined based on whether a SS set is dropped in a slot to which each MO belongs. In an example of FIG. 11, i) or ii) is about a case in which PDCCH overbooking does not occur at MO2 or a case in which BD is performed at MO2 as in FIG. 10 (and CCE channel estimation at each MO, or CCE channel estimation for all MOs at a MO that BD is performed). If PDCCH overbooking occurs at MO2, as in iii) in an example of FIG. 11, BD may be performed at MO1 and channel estimation for 4 CCEs may be performed, and a SS set is dropped for MO2, so BD and CCE channel estimation may not be performed.

In other words, a BD/CCE assumption may be adaptively changed based on whether a SS set is dropped. In other words, when the same PDCCH is repetitively/partitively transmitted through a plurality of PDCCH candidates belonging to a different MO, BD may be performed one time at a specific MO after all PDCCHs which are repetitively/partitively transmitted are received. In this case, the specific MO may be determined based on order of a MO (e.g., an index), whether a SS set is dropped at a corresponding MO, etc. For example, when BD is basically performed at a last MO (or a MO with the largest index) among MOs associated with PDCCH repetition/division transmission, but it is determined that a SS set with which PDCCH repetition/division transmission is associated will be dropped due to PDCCH overbooking at a last MO, BD may be performed at a MO (e.g., MO index i−1) right before a last MO (e.g., MO index i).

Embodiment 1-2

In embodiment 1-1, a case is assumed in which repetition/division transmission is applied to all PDCCH candidate (s) that a terminal is configured for a SS set. In this case, only PDCCH repetition/division transmission may be supported regardless of channel quality or necessity of repeat/division transmission in a specific SS set. Contrary to it, a base station may dynamically apply whether PDCCH repetition/division transmission is applied in a specific SS set by considering channel quality or necessity of repeat/division transmission. For example, a base station may configure both a SS set for repetition/division transmission and a SS set for one-time transmission to switch and apply a PDCCH repetition/division transmission method and a PDCCH transmission method to which repetition/division transmission is not applied (i.e., non-repetition/division transmission or one-time transmission). In this case, a problem may occur that the number of SS sets which should be configured for a terminal increases.

To prevent such a problem, both a one-time transmission method and a repetition/division transmission method of a PDCCH may be supported in one SS set. As such, when there is a SS set that one-time transmission and repetition/division transmission may coexist, it is required to clarify a method of counting the number of BD/CCEs.

Figure 12:
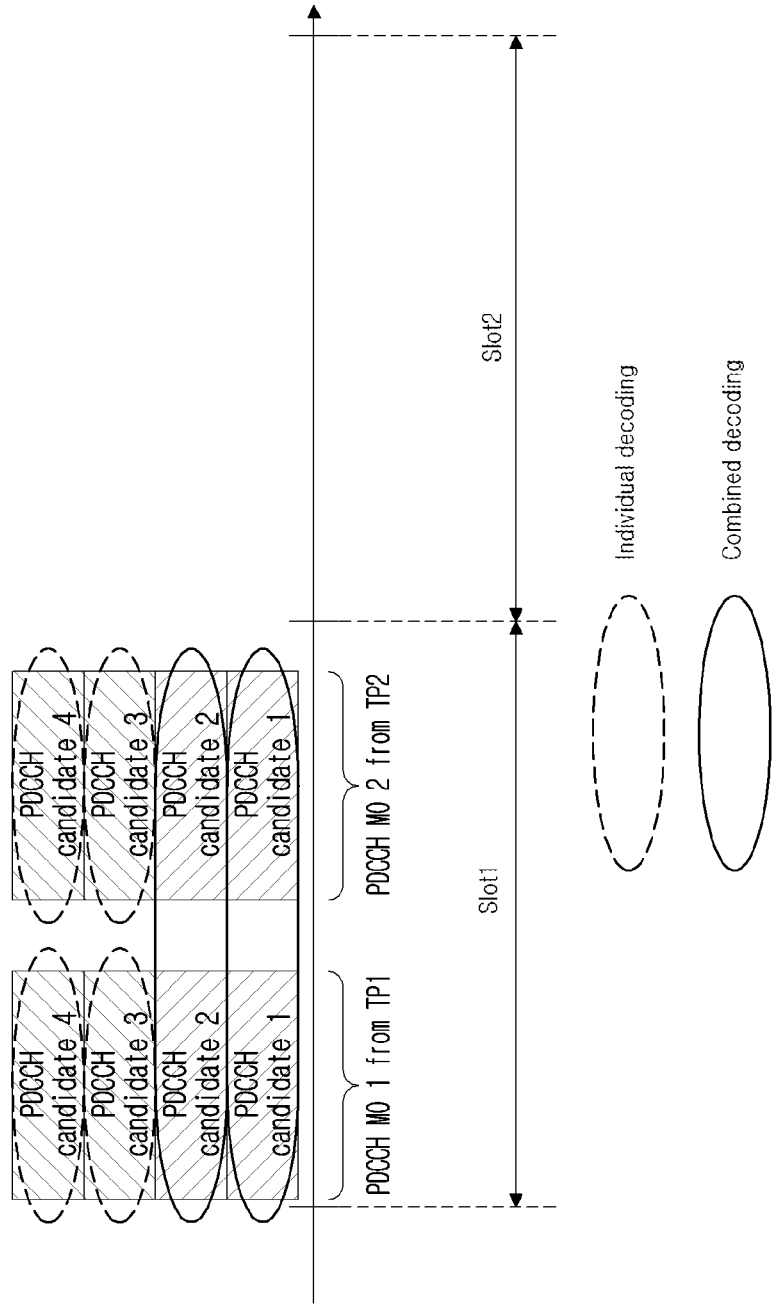

FIG. 12 is a diagram for describing the number of PDCCH BD/CCEs according to an embodiment of the present disclosure.

An example of FIG. 12 represents an example that a method in which MTRPs repetitively/partitively transmit the same PDCCH and a method in which a STRP transmits a PDCCH 1 time are configured together in one SS set. An example of FIG. 12 represents that for one-time transmission, individual decoding is applied and for repetition/division transmission, combined decoding is applied.

Similar to an example of FIG. 10, also in an example of FIG. 12, for clarity of a description, it is assumed that an AL for a PDCCH candidate is 1, there are 2 SS sets/MOs in one time unit (e.g., a slot), there are 4 PDCCH candidates in each SS set/MO, one DCI format may be transmitted to each PDCCH candidate, MO1 is associated with TP1 and MO2 is associated with TP2.

An example of FIG. 12 assumes that PDCCH repetition/division transmission is configured for some PDCCH candidates (e.g., candidate 1 and 2) and PDCCH one-time transmission is configured for other PDCCH candidates (e.g., candidate 3 and 4) at each MO. Accordingly, a terminal may perform BD for candidate 3 and 4 at MO1 and wait until PDCCH repetition/division transmission is completed at MO2 without performing MD for candidate 1 and 2. A terminal may perform BD for candidate 3 and 4 at MO2 and perform BD by combining candidate i received at MO1 (e.g., i=1, 2) and candidate i received at MO2 (e.g., i=1, 2)). As a result, a terminal may perform BD 2 times and channel estimation for 4 CCEs at MO1 and perform BD 4 times and channel estimation for 4 CCEs at MO2 (example i) of FIG. 12).

As an additional example, if a channel of TP1 is better than a channel of TP2 on average (e.g., when a SINR of a channel from TP2 is higher than a SINR of a channel from TP1), there may be a limit that only TP1 may perform one-time transmission and TP2 may transmit a PDCCH only in repetition/division transmission. In this case, PDCCH candidate 3 and 4 at MO2 may be transmitted by TP1, not TP2, one time. As a specific example, a QCL RS of a DMRS of PDCCH candidate 3 and 4 may be configured as a RS transmitted by TP1 (e.g., a SSB/a CSI-RS/a TRS) at MO2 and a QCL RS of a DMRS of PDCCH candidate 1 and 2 may be configured as a RS transmitted by TP2 (e.g., a SSB/a CSI-RS/a TRS) at MO2 (in this case, the number of BD/CCEs of a terminal is the same as in example i) of FIG. 12). Alternatively, PDCCH candidate 3 and 4 at MO2 may be ignored without being transmitted/received (i.e., a terminal skips monitoring) (example ii) of FIG. 12).

As an additional example, candidate 1 and 2 configured by PDCCH repetition/division transmission in embodiment 1-2 do not perform BD at MO1, so channel estimation for a corresponding candidate may be delayed to MO2 (i.e., CCE channel estimation is not performed at a MO where BD is not performed for PDCCH repetition/division transmission and CCE channel estimation is performed together at a MO where BD is performed). In this case, a CCE may become 2 at MO1 (i.e., channel estimation for PDCCH one-time transmission) and a CCE may become 6 at MO2 (i.e., channel estimation for 4 CCEs of MO2 and channel estimation for 2 CCEs for PDCCH repetition/division transmission of MO1) (example iii) of FIG. 12).

As an additional example, when MO1 and MO2 are positioned in a different slot unlike shown in FIG. 12, the number of BD/CCEs may be determined according to example i), ii), or iii) of FIG. 12 if PDCCH overbooking does not occur in a slot of MO2. If PDCCH overbooking occurs in a slot of MO2, similar to an example of FIG. 11, a BD/CCE assumption may be adaptively changed based on whether a SS set is dropped. In this case, for example, BD for a PDCCH candidate which is repetitively/partitively transmitted may be performed at MO1 and channel estimation for 4 CCEs may be performed. BD and CCE channel estimation may not be performed at MO2 due to a SS set drop (example iv) of FIG. 12).

In embodiment 1-2, a base station may dynamically determine whether PDCCH repetition/division transmission or one-time transmission is performed for each SS set to perform transmission in a desired manner. In addition, a base station may use a different PDCCH candidate of one SS set for repetition/division transmission or one-time transmission, so it may have a higher degree of scheduling freedom compared with embodiment 1-1. On the other hand, for embodiment 1-2, compared with embodiment 1-1, as the number of BD of a terminal increases, BD complexity may increase.

Embodiment 1-3

In embodiment 1-2, it was assumed that for a plurality of PDCCH candidates in each MO/SS set, PDCCH one-time transmission is configured for candidate (s) belonging to a first candidate group, PDCCH repetition/division transmission is configured for candidate (s) belonging to a second candidate group and a first and second candidate group are mutually exclusive. Accordingly, PDCCH candidate (s) which may perform PDCCH one-time transmission are limited to some candidate (s) of all candidates in one MO/SS set and similarly, PDCCH candidate (s) which may perform PDCCH repetition/division transmission are limited to other candidate (s) of all candidates in one MO/SS set.

To improve resource utilization efficiency, alleviating/removing such a limit may be considered. For example, a PDCCH candidate group which may perform one-time transmission and a PDCCH candidate group which may perform repetition/division transmission may be configured by being overlapped. In other words, for some or all PDCCH candidates in one MO/SS set, any one of one-time transmission or repetition/division transmission may be supported/configured. In this case, it is required to clarify a method of counting the number of BD/CCEs.

Figure 13:
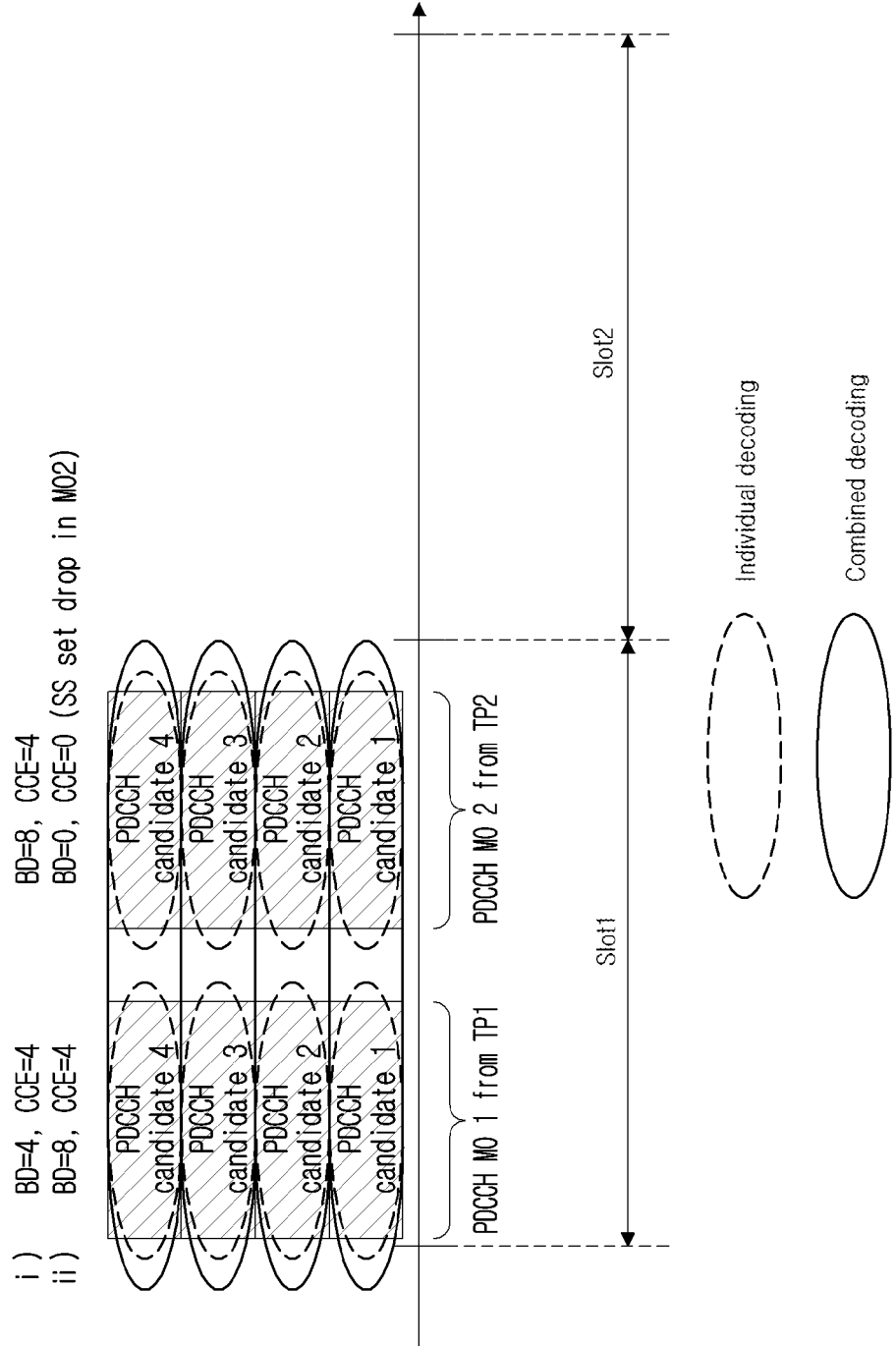

FIG. 13 is a diagram for describing the number of PDCCH BD/CCEs according to an embodiment of the present disclosure.

In an example of FIG. 13, any PDCCH candidate corresponding to each MO/SS set may be used for PDCCH repetition/division transmission and may be used for one-time transmission. An example of FIG. 13 represents that for one-time transmission, individual decoding is applied and for repetition/division transmission, combined decoding is applied.

Similar to an example of FIG. 12, also in an example of FIG. 13, for clarity of a description, it is assumed that an AL for a PDCCH candidate is 1, there are 2 SS sets/MOs in one time unit (e.g., a slot), there are 4 PDCCH candidates in each SS set/MO, one DCI format may be transmitted to each PDCCH candidate, MO1 is associated with TP1 and MO2 is associated with TP2.

In an example of FIG. 13, it is assumed that PDCCH repetition/division transmission or one-time transmission may be performed in each of all PDCCH candidates (e.g., candidate 1, 2, 3, 4) at each MO. Accordingly, a terminal may perform BD for each of candidate 1, 2, 3 and 4 by considering a possibility of PDCCH one-time transmission at MO1 and may also perform BD for each of candidate 1, 2, 3 and 4 by considering a possibility of PDCCH one-time transmission at MO2. Additionally, by considering a possibility of PDCCH repetition/division transmission across MO1 and MO2, a terminal may perform BD by combining candidate i received at MO2 (e.g., i=1, 2, 3, 4) and candidate i received at MO1 (e.g., i=1, 2, 3, 4). As a result, a terminal may perform BD 4 times (i.e., 4 BD for one-time transmission) and channel estimation for 4 CCEs (it does not distinguish one-time transmission from repetition/division transmission) at MO1 and may perform BD 8 times (i.e., 4 BD for one-time transmission and 4 BD for repetition/division transmission) and channel estimation for 4 CCEs (it does not distinguish one-time transmission from repetition/division transmission) at MO2 (example i) of FIG. 13).

In other words, BD for one-time transmission may be performed in a PDCCH candidate at each MO and BD for repetition/division transmission may be performed in each PDCCH candidate group grouped by considering repetition/division transmission. For example, when the number of MOs in one slot is referred to as m, the number of PDCCH candidates at each MO is referred to as n and the number of PDCCH candidate groups for repetition/division transmission is referred to as g, the total number of BD in a corresponding slot may be m*n+g.

As an additional example, when MO1 and MO2 are positioned in a different slot unlike shown in FIG. 13, the number of BD/CCEs may be determined according to example i) of FIG. 13 if PDCCH overbooking does not occur in a slot of MO2. If PDCCH overbooking occurs in a slot of MO2, similar to an example of FIG. 11, a BD/CCE assumption may be adaptively changed based on whether a SS set is dropped. In this case, for example, BD for a PDCCH candidate which is repetitively/partitively transmitted may be performed at MO1, BD for a PDCCH candidate which is transmitted 1 time may be performed at MO1 and channel estimation for 4 CCEs of MO1 may be performed. BD and CCE channel estimation may not be performed at MO2 due to a SS set drop (example ii) of FIG. 13).

In embodiment 1-3, a base station may dynamically determine whether a PDCCH is repetitively/partitively transmitted or transmitted 1 time for each SS set to perform transmission in a desired manner. In addition, a base station may use all (or some) PDCCH candidates of one SS set for both repetition/division transmission and one-time transmission, so it may have a higher degree of scheduling freedom compared with embodiment 1-1 and 1-2. On the other hand, for embodiment 1-3, compared with embodiment 1-1 and 1-2, as the number of BD of a terminal increases, BD complexity may increase.

Embodiment 1-4

In embodiment 1-3, a problem may occur that BD complexity of a terminal increases as BD assuming both PDCCH one-time transmission and repetition/division transmission is performed at a specific MO. To solve it, there may be a limit that BD for one-time transmission is not performed at a MO performing BD for PDCCH repetition/division transmission.

Figure 14:
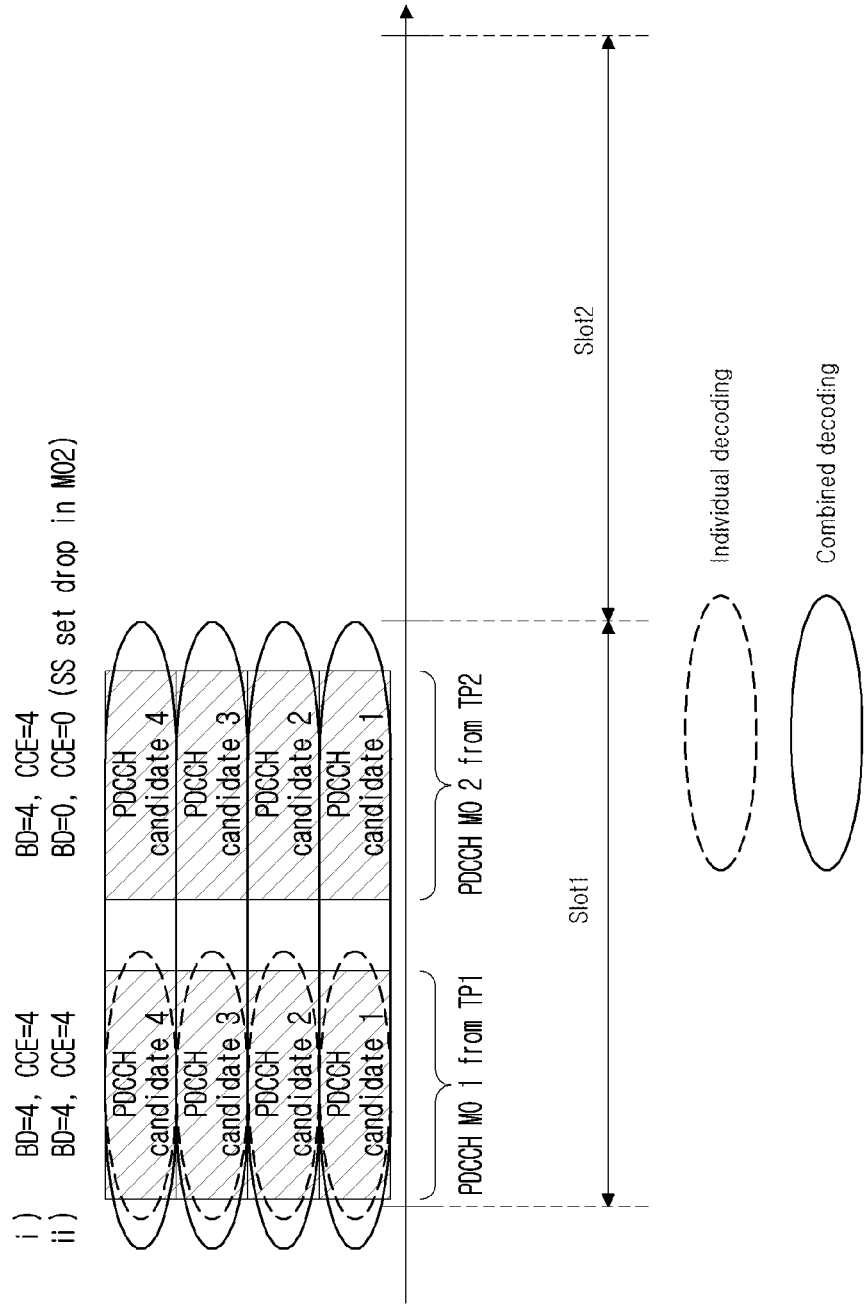

FIG. 14 is a diagram for describing the number of PDCCH BD/CCEs according to an embodiment of the present disclosure.

In an example of FIG. 14, any PDCCH candidate corresponding to each MO/SS set may be used for PDCCH repetition/division transmission and may be also used for one-time transmission. When BD for PDCCH repetition/division transmission is performed at MO2, BD for PDCCH one-time transmission may not be performed at MO2. An example of FIG. 14 represents that for one-time transmission, individual decoding is applied and for repetition/division transmission, combined decoding is applied.

Similar to an example of FIG. 13, also in an example of FIG. 14, for clarity of a description, it is assumed that an AL for a PDCCH candidate is 1, there are 2 SS sets/MOs in one time unit (e.g., a slot), there are 4 PDCCH candidates in each SS set/MO, one DCI format may be transmitted to each PDCCH candidate, MO1 is associated with TP1 and MO2 is associated with TP2.

In an example of FIG. 14, a terminal may perform BD for each of candidate 1, 2, 3 and 4 by considering a possibility of PDCCH one-time transmission at MO1. Additionally, by considering a possibility of PDCCH repetition/division transmission across MO1 and MO2, a terminal may perform BD by combining candidate i received at MO2 (e.g., i=1, 2, 3, 4) and candidate i received at MO1 (e.g., i=1, 2, 3, 4). BD for PDCCH repetition/division transmission is assumed at MO2, so BD for PDCCH one-time transmission may not be performed at MO2. As a result, a terminal may perform BD 4 times (i.e., 4 BD for one-time transmission) and channel estimation for 4 CCEs at MO1 and perform BD 4 times (i.e., 4 BD for repetition/division transmission) and channel estimation for 4 CCEs at MO2 (example i) of FIG. 14).

As an additional example, when MO1 and MO2 are positioned in a different slot unlike shown in FIG. 14, the number of BD/CCEs may be determined according to example i) of FIG. 14 if PDCCH overbooking does not occur in a slot of MO2. If PDCCH overbooking occurs in a slot of MO2, similar to an example of FIG. 11, a BD/CCE assumption may be adaptively changed based on whether a SS set is dropped. In this case, for example, BD for a PDCCH candidate which is repetitively/partitively transmitted may be performed at MO1 and channel estimation for 4 CCEs may be performed. In this case, BD for PDCCH one-time transmission may not be performed at MO1. Meanwhile, BD and CCE channel estimation may not be performed at MO2 due to a SS set drop (example ii) of FIG. 14).

Embodiment 1-5

A terminal may perform a variety of operations based on a DCI reception occasion.

For example, whether a default beam is applied may be different according to time given from a DCI reception occasion to a reception occasion of a PDSCH scheduled by corresponding DCI. Additionally or alternatively, a terminal operation may be different according to time given from a DCI reception occasion to a transmission occasion of a PUSCH scheduled by corresponding DCI. Additionally or alternatively, a terminal operation may be different according to time given from a DCI reception occasion to a transmission occasion of aperiodic (AP) CSI reporting triggered by corresponding DCI. Additionally or alternatively, whether a default beam is applied may be different according to time given from a DCI reception occasion to a reception occasion of an AP CSI-RS scheduled by corresponding DCI. Additionally or alternatively, a terminal operation may be different according to the minimum time necessary to change a BWP indicated by corresponding DCI from a DCI reception occasion.

If a DCI reception occasion is not clearly determined, a problem occurs because a terminal operation assumed by a base station is different from an actual terminal operation, so it is necessary to clarify a DCI reception occasion.

For example, in embodiment 1-3 or 1-4, when a base station repetitively/partitively transmits PDCCH candidate i across a plurality of MO/SS sets, a terminal may succeed in BD for one-time transmission of PDCCH candidate i at MO1 and succeed in BD for repetition/division transmission of candidate i at MO2. In other words, a case may occur in which both BD of one-time transmission and repetition/division transmission succeed for the same PDCCH candidate. In this case, a terminal should recognize DCI decoded in a corresponding PDCCH candidate by repetition/division transmission, not one-time transmission, and may determine a DCI reception occasion based on a PDCCH candidate of MO2, an occasion when repetition/division transmission is completed. Alternatively, a terminal may determine a DCI reception occasion based on a specific MO of MOs which are repetitively/partitively transmitted or a base station may indicate/configure to a terminal a specific MO which is a standard for a DCI reception occasion.

As an additional example, in embodiment 1-3 or 1-4, when a base station repetitively/partitively transmits PDCCH candidate i, a terminal may succeed in BD for one-time transmission of PDCCH candidate i at MO1 and fail in BD for repetition/division transmission of candidate i at MO2. In this case, although a PDCCH is repetitively/partitively transmitted in a base station, a terminal may understand that a PDCCH is transmitted 1 time at MO1. As a result, a terminal may determine a DCI reception occasion based on a PDCCH candidate which succeeded in BD at MO1. In this case, a DCI reception occasion assumed by a base station (i.e., a reception occasion of a last received PDCCH candidate which is repetitively/partitively transmitted) is different from a DCI reception occasion determined by a terminal, so a terminal operation assumed by a base station may be different from an actual terminal operation.

To prevent such a problem, there may be a limit that PDCCH one-time transmission is possible only at a last occasion of repetition/division transmission (e.g., MO2).

Figure 15:
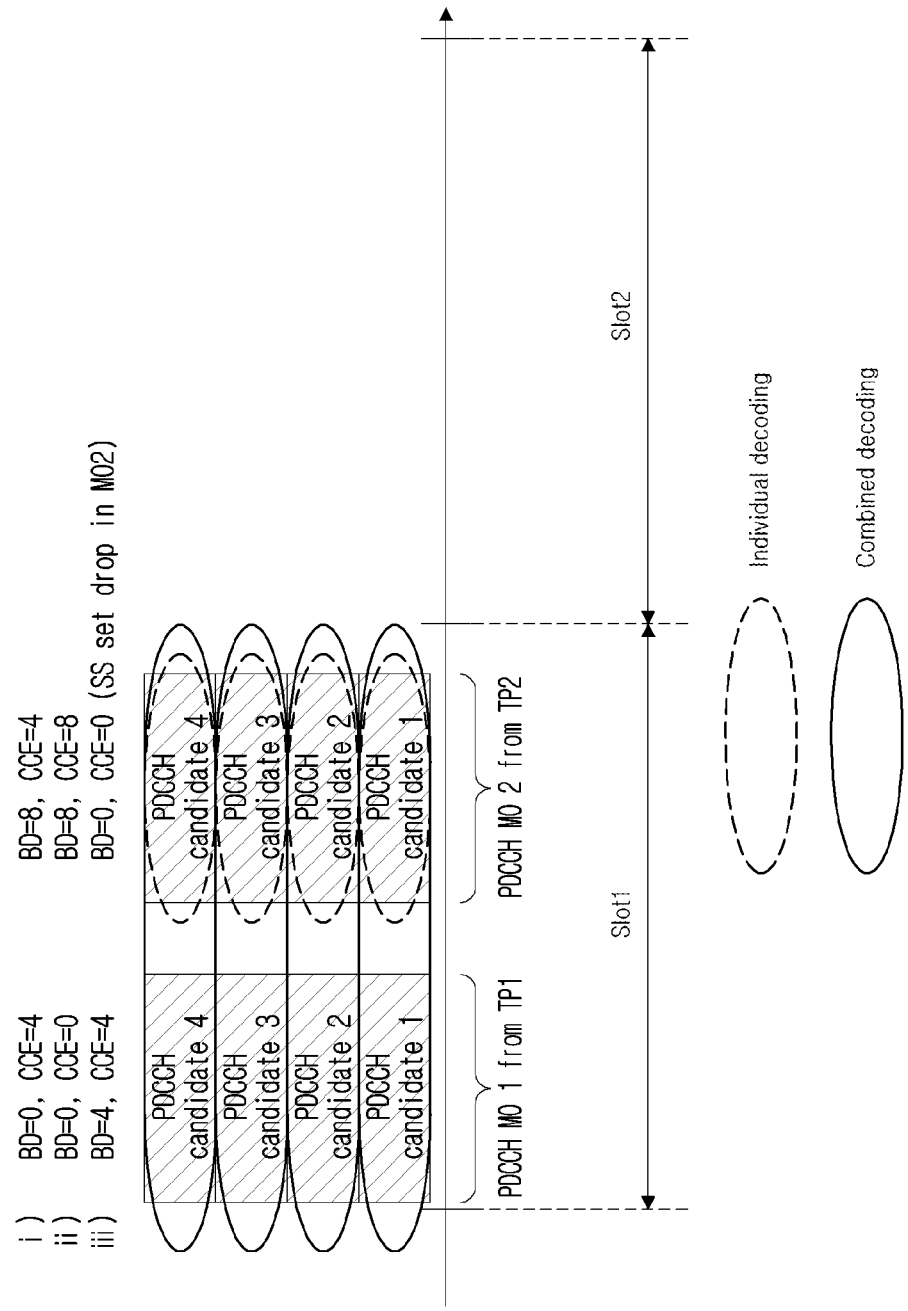

FIG. 15 is a diagram for describing the number of PDCCH BD/CCEs according to an embodiment of the present disclosure.

In an example of FIG. 15, any PDCCH candidate corresponding to each MO/SS set may be used for PDCCH repetition/division transmission and PDCCH one-time transmission may be performed only in a PDCCH candidate belonging to a last MO/SS set of repetition/division transmission. When BD for PDCCH repetition/division transmission is performed at MO2, BD for PDCCH one-time transmission may not be performed at MO1 and BD for PDCCH one-time transmission may be performed at MO2. An example of FIG. 15 represents that for one-time transmission, individual decoding is applied and for repetition/division transmission, combined decoding is applied.

Similar to an example of FIG. 14, also in an example of FIG. 15, for clarity of a description, it is assumed that an AL for a PDCCH candidate is 1, there are 2 SS sets/MOs in one time unit (e.g., a slot), there are 4 PDCCH candidates in each SS set/MO, one DCI format may be transmitted to each PDCCH candidate, MO1 is associated with TP1 and MO2 is associated with TP2.

In an example of FIG. 15, by considering a possibility of PDCCH repetition/division transmission across MO1 and MO2, a terminal may perform BD by combining candidate i received at MO2 (e.g., i=1, 2, 3, 4) and candidate i received at MO1 (e.g., i=1, 2, 3, 4). In addition, BD may be performed for each of candidate 1, 2, 3 and 4 by considering a possibility of PDCCH one-time transmission at MO2. BD for PDCCH repetition/division transmission is assumed at MO2, so BD for PDCCH one-time transmission may not be performed at MO1. As a result, a terminal may perform BD 0 time and channel estimation for 4 CCEs at MO1 and perform BD 8 times (i.e., 4 BD for repetition/division transmission and 4 BD for one-time transmission) and channel estimation for 4 CCEs at MO2 (example i) of FIG. 15).

As an additional example, BD for PDCCH repetition/division transmission is not performed at MO1, so channel estimation may be delayed to MO2 (i.e., CCE channel estimation is not performed at a MO where BD is not performed for PDCCH repetition/division transmission and CCE channel estimation is performed together at a MO where BD is performed. In this case, a CCE may become 0 at MO1 and a CCE may become 8 at MO2 (i.e., both channel estimation of MO1 and MO2 are performed at MO2) (example ii) of FIG. 15).

Accordingly, a case in which a DCI reception occasion of a terminal is different from a DCI reception occasion of a terminal assumed by a base station may be prevented as much as possible.

As an additional example, when MO1 and MO2 are positioned in a different slot unlike shown in FIG. 15, the number of BD/CCEs may be determined according to example i) or ii) of FIG. 15 if PDCCH overbooking does not occur in a slot of MO2. If PDCCH overbooking occurs in a slot of MO2, similar to an example of FIG. 11, a BD/CCE assumption may be adaptively changed based on whether a SS set is dropped. In this case, for example, BD for a PDCCH candidate which is repetitively/partitively transmitted may be performed at MO1. BD for a PDCCH candidate which is transmitted 1 time may be performed at MO2, a last occasion of repetition/division transmission, but BD and CCE channel estimation may not be performed at MO2 due to a SS set drop. As a result, a terminal may perform BD 4 times (i.e., 4 BD for repetition/division transmission) and channel estimation for 4 CCEs at MO1 (example iii) of FIG. 15).

When PDCCH overbooking occurs in a late slot, a DCI reception occasion of a terminal may be different from a DCI reception occasion of a terminal assumed by a base station, but even for PDCCH overbooking, such an example may be applied so that a terminal will monitor DCI as much as possible rather than not monitoring DCI at all.

As an additional example, a base station may configure/ indicate information related to DCI repetition/division transmission to a terminal to prevent a problem that a DCI reception occasion of a terminal is different from a DCI reception occasion of a terminal assumed by a base station. For example, information related to DCI repetition/division transmission may include information on whether corresponding DCI is repetitively/partitively transmitted or is transmitted 1 time, information on the number of MOs used for repetition/division transmission in case of repetition/ division transmission, etc.

Embodiment 2

The above-described examples (e.g., embodiment 1-1/1-2/1-3/1-4/1-5) assumed a case in which the number of PDCCH repetition/division is 2, but in the following embodiments, matters which will be additionally considered for a case in which the number of PDCCH repetition/ division (=N) is equal to or greater than 3 are described.

Figure 16:
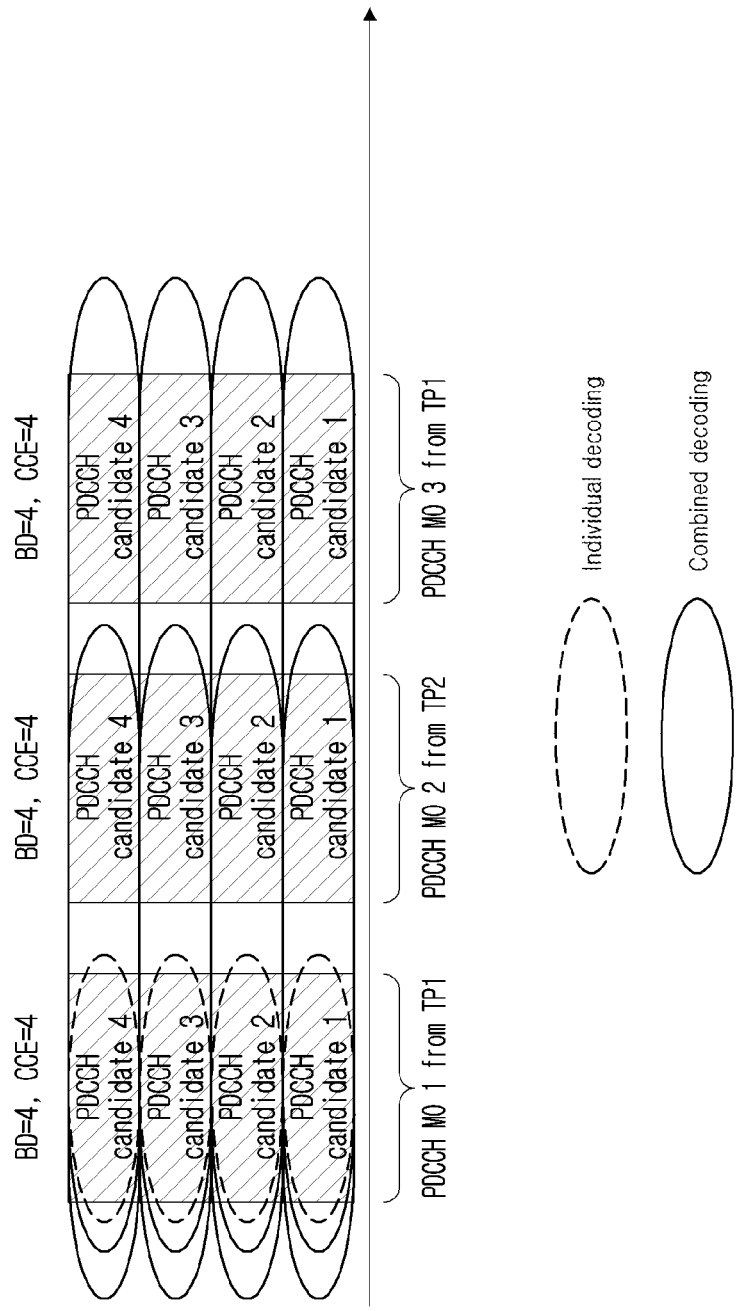

FIG. 16 is a diagram for describing the number of PDCCH BD/CCEs according to an embodiment of the present disclosure.

When the number of PDCCH repetition/division (=N) is equal to or greater than 3, a terminal needs to determine whether PDCCH BD for N−1 or less transmission will be performed. FIG. 16 may correspond to an example of a BD operation for a PDCCH of a terminal for N=3.

In FIG. 16, when the same PDCCH is repetitively/ partitively transmitted across MO1, MO2 and MO3, a terminal may perform BD for one-time transmission by receiving a PDCCH of MO1, perform BD for 2-time repetition/division transmission by receiving a PDCCH of MO1 and MO2 and perform BD for 3-time repetition/division transmission by receiving a PDCCH of MO1, MO2 and MO3. When PDCCH BD for N−1 or less (i.e., one-time transmission and 2-time repetition/division transmission in an example of FIG. 16) transmission is performed, PDCCH reliability may be improved compared to a case in which it is not, but terminal implementation complexity may increase as the number of BD of a terminal increases. Accordingly, when reliability is prioritized, PDCCH BD for N−1 or less (i.e., one-time transmission or N−1 repetition/division transmission) may be performed with PDCCH BD for N repetition/division transmission, and only PDCCH BD for N repetition/division transmission may be performed to reduce terminal implementation complexity.

As an additional example, only PDCCH BD for M (M is an integer equal to or less than N) or over (or less) (repetition/division) transmission may be performed. For example, the M value may be indicated by a base station to a terminal. In other words, a base station may indicate to a terminal how many times PDCCH BD for (repetition/division) transmission will be performed among the total N times. Additionally or alternatively, a terminal may report a value of N which may be supported as much as possible and how many times PDCCH BD for (repetition/division) transmission is supported for given N to a base station as terminal capability information. Such a method may be also applied to embodiments described after as well as the above-described embodiment 1 and its detailed embodiments.

As an additional example, a BD/CCE counting method may be also applied by performing switching between the above-described embodiments (e.g., embodiment 1-1/1-2/1-3/1-4/1-5/2, etc.) according to a N value. For example, if embodiment 1-3 is applied when a N value is large, a burden for terminal implementation is larger as the number of BD of a terminal increases. Accordingly, a method of counting the number of BD/CCEs with high or low terminal complexity may be applied according to a predetermined reference value. For example, when a N value is smaller than a predetermined preference value (e.g., N<=2), embodiment 1-3 may be applied and when a N value is larger than a predetermined preference value (e.g., N>2), embodiment 1-4 may be applied.

Specifically, a BD/CCE calculation capability of a terminal is defined per predetermined time unit (e.g., a slot), and when repeated/partitioned PDCCHs are configured intensively in one slot, BD/CCE calculation complexity of a corresponding PDCCH may increase. Accordingly, by distinguishing between a case in which a PDCCH which is repetitively/partitively transmitted is concentrated on one slot and a case in which it is not, a BD/CCE counting method may be also applied by performing switching between the above-described embodiments (e.g., embodiment 1-1/1-2/1-3/1-4/1-5/2, etc.). For example, if embodiment 1-3 is applied when a PDCCH which is repetitively/partitively transmitted is concentrated on one slot, a burden for terminal implementation is larger as the number of BD of a terminal increases. Accordingly, when a PDCCH which is repetitively/partitively transmitted is transmitted across slots equal to or greater than the predetermined reference number, embodiment 1-3 may be applied and when a PDCCH which is repetitively/partitively transmitted is transmitted across slots less than the predetermined reference number, embodiment 1-4 may be applied. Alternatively, when the number of PDCCHs which are repetitively/partitively transmitted in one slot is equal to or less than the predetermined reference number, embodiment 1-3 may be applied and when the number of PDCCHs which are repetitively/partitively transmitted in one slot is less than the predetermined reference number, embodiment 1-4 may be applied.

As an additional example, a BD/CCE counting method may be also applied by performing switching between the above-described embodiments (e.g., embodiment 1-1/1-2/1-3/1-4/1-5/2, etc.) by considering both a N value and the number of slots used to transmit a PDCCH which is repetitively/partitively transmitted (or, the number of PDCCHs which are repetitively/partitively transmitted in one slot).

As an additional example, in performing only PDCCH BD for M (M is an integer equal to or less than N) or over repetition/division transmission when N repetition/division transmission is configured, a burden for terminal implementation is larger as M is smaller, so a M value may be also determined by considering one or more of a N value or the number of slots used to transmit a PDCCH which is repetitively/partitively transmitted (or, the number of PDCCHs which are repetitively/partitively transmitted in one slot).

Also when a N value is equal to or greater than 3, a BD/CCE assumption may be adaptively changed based on whether a SS set is dropped in each slot. In other words, when the same PDCCH is repetitively/partitively transmitted through a plurality of PDCCH candidates belonging to a different MO, BD may be performed one time at a specific MO after all PDCCHs which are repetitively/partitively transmitted are received. In this case, the specific MO may be determined based on order of MOs (e.g., an index), whether a SS set is dropped at a corresponding MO, etc. For example, when BD is basically performed at a last MO (or a MO with the largest index) of MOs associated with PDCCH repetition/division transmission, but it is determined that a SS set associated with PDCCH repetition/division transmission will be dropped because PDCCH overbooking occurs at a last MO, BD may be performed at a MO (e.g., MO index i−1) right before a last MO (e.g., MO index i) and when PDCCH overbooking also occurs at a corresponding MO, BD may be performed right before that (e.g., MO index i−2). Similarly, when PDCCH repetition/division transmission is performed across multiple units (e.g., slots), a MO that PDCCH overbooking in each slot does not occur (or a corresponding SS set is not dropped) may be determined in ascending order from a last MO index (i.e., the largest MO index) and BD for repetition/division transmission (i.e., combined decoding) may be performed at a determined MO.

Embodiment 3

The above-described examples assumed for clarity of a description that each PDCCH candidate transmits only one DCI format, but a DCI format which may be transmitted per each TP may be configured differently. For example, TP1 may transmit both fallback DCI (e.g., DCI format 1-0 or 0-0) and non-fallback DCI (e.g., DCI format 1-1 or 0-1) and TP2 may be configured to transmit non-fallback DCI. A fallback mode is generally designed to support a basic transmission operation unrelated to a RRC configuration, so as in the existing method, only TP1 may perform PDCCH one-time transmission and in a non-fallback mode, a MTRP PDCCH repetition transmission method may be used.

For convenience of a description, the following matter may be assumed. But, such an assumption does not limit a technical scope of the present disclosure. For example, a DCI format which may perform repetition/division transmission may be configured as an intersection of DCI formats that a plurality of TPs may be transmitted. For example, if it is assumed that TP1 may transmit DCI format 1-0 and 1-1 and TP2 may transmit DCI format 1-1 and 0-1, a DCI format which may perform repetition/division transmission may be determined as DCI format 1-1. Accordingly, when a terminal performs BD for a PDCCH which is repetitively/partitively transmitted, BD may be performed by assuming a corresponding DCI format (e.g., DCI format 1-1).

In this case, a DCI format which may perform one-time transmission may be different per MO. For example, for MO1, only TP1 may be determined as a transmittable DCI format (e.g., DCI format 1-0) and for MO2, only TP2 may be determined as a transmittable DCI format (e.g., DCI format 0-1). Accordingly, a terminal may perform BD for one-time transmission at MO1 by assuming DCI format 1-0 and perform BD for one-time transmission at MO2 by assuming DCI format 0-1.

As an additional example, for an intersection DCI format (e.g., DCI 1-1), BD may be performed by assuming a DCI format that one-time transmission may not be performed according to embodiment 1-1/1-2 (i.e., a terminal does not perform BD for one-time transmission) and one-time transmission may be performed per MO according to embodiment 1-3/1-4/1-5/2.

Embodiment 4

According to the above-described examples (e.g., embodiment 1-3/1-4/1-5/2), repetition/division transmission PDCCH candidates may be used as a one-time transmission PDCCH candidate and as a result, a base station may dynamically determine a repetition/division transmission method and a one-time transmission method.

Even when a base station is semi-statically configured to repetitively/partitively transmit a PDCCH for a specific CORESET/SS set, as in embodiment 1-3/1-4/1-5/2, a terminal may additionally perform BD for a one-time transmission PDCCH candidate for a corresponding CORESET/SS set. In other words, a base station actually performs only repetition/division transmission, but a terminal may additionally perform BD for one-time transmission as well as perform BD for repetition/division transmission. As a result, PDCCH reliability may be improved.

For example, when TP1 and TP2 repetitively transmit the same DCI at MO1 and MO2 respectively, there is a possibility of failing in decoding due to a PDCCH candidate of MO2 with a low reception SINR according to a BD operation of embodiment 1-1 if a channel of TP2 is bad. On the other hand, if a terminal performs BD also at MO1 as in embodiment 1-3, it is not influenced by TP2 whose channel is bad, so a PDCCH reception success probability may increase.

Here, based on whether each PDCCH candidate composing a multiple-time (i.e., repetition/division) transmission PDCCH may perform self-decoding, whether BD for a one-time transmission PDCCH candidate will be additionally performed may be determined. If each PDCCH candidate may perform self-decoding, PDCCH reliability may be improved by performing BD for a one-time transmission PDCCH candidate. If each PDCCH candidate may not perform self-decoding, BD for a one-time transmission PDCCH candidate is meaningless, so as in embodiment 1-1, only BD for a multiple-time transmission PDCCH may be performed.

When the same DCI is repetitively transmitted in multiple PDCCH candidates, each PDCCH candidate may perform self-decoding. When the same DCI is partitively transmitted in multiple PDCCH candidates, each PDCCH candidate may or may not perform self-decoding according to an implementation method.

Accordingly, according to whether of repetition transmission or division transmission, and according to an implementation method in case of division transmission, whether only BD for a multiple-time transmission PDCCH will be performed or whether BD for a one-time transmission PDCCH will be also performed BD additionally with BD for a multiple-time transmission PDCCH may be determined. In other words, based on whether self-decoding may be performed, a BD operation (e.g., BD for a multiple-time transmission PDCCH and/or BD for a one-time transmission PDCCH) may be determined.

There may be two implementation methods for a case in which the same DCI is partitively transmitted in multiple PDCCH candidates.

For example, as a first implementation method, a DCI payload (e.g., a control information bit and CRC) may be encoded through one channel encoder (e.g., a polar encoder) and coded bits obtained thereby may be partitioned and transmitted by a plurality of TRPs. In this case, for coded bits transmitted by each TRP, all DCI payloads may be encoded and included or only part of a DCI payload may be encoded and included. For the former, a terminal may acquire all DCI payloads although it decodes a PDCCH candidate transmitted by one TRP. Accordingly, it is advantageous to perform both BD for a multiple-time transmission PDCCH and BD for a one-time transmission PDCCH. For the latter, a terminal may not acquire all DCI payloads although it decodes a PDCCH candidate transmitted by one TRP. Accordingly, only BD for a multiple-time transmission PDCCH may be performed.

As a second implementation method, a DCI payload (e.g., a control information bit and CRC) may be partitioned by a plurality of DCI (e.g., 2, i.e., DCI1 and DCI2) and each may be encoded through a channel encoder (e.g., a polar encoder). A plurality of TRPs may transmit a plurality of DCI, respectively. For example, TRP1 may transmit coded bits corresponding to DCI1 and TRP2 may transmit coded bits corresponding to DCI2. In this case, only part of a DCI payload (e.g., DCI1 or DCI2) may be encoded and included in coded bits transmitted by each TRP, so a terminal may not acquire all DCI payloads although it decodes a PDCCH candidate transmitted by one TRP. In addition, each PDCCH candidate transmits a different source bit (e.g., DCI1 or DCI2), so it needs to decode a PDCCH candidate of MO1 and a PDCCH candidate of MO2, respectively. As a result, a terminal, as in an example of FIG. 9, should assume PDCCH one-time transmission and perform BD for each MO and should receive DCI1 through BD of MO1, receive DCI2 through BD of MO2 and generate a DCI payload by connecting DCI1 and DCI 2 (e.g., through bit concatenation).

Embodiment 5

In the above-described examples, a terminal may determine whether a SS set is dropped according to a SS set priority by comparing the number of BD/CCEs with a BD/CCE limit per predetermined time unit (TU) (e.g., one slot). In PDCCH repetition/division transmission, as in the above-described examples, the number of PDCCH BD/CCEs of MO1 and the number of PDCCH BD/CCEs of MO2 may be determined based on a variety of methods (i.e., a BD/CCE counting method or embodiment 1-1/1-2/1-3/1-4/1-5 for a BD operation).

Here, if a case occurs in which a BD/CCE limit is exceeded in a specific TU, it may be configured not to exceed a BD/CCE limit in a corresponding TU by reducing the number of BD/CCEs of a PDCCH candidate configured for PDCCH repetition/division transmission. As long as a resulting BD/CCE count value does not exceed a BD/CCE limit, BD for a PDCCH candidate of a different SS set (e.g., a SS set which will be dropped if the number of BD/CCEs of a PDCCH candidate configured for PDCCH repetition/division transmission is not reduced) may be performed in a corresponding TU.

FIG. 13 is a diagram for describing the number of PDCCH BD/CCEs according to an embodiment of the present disclosure.

The number of BD (or BD complexity) for a case of performing individual decoding for one PDCCH candidate at each MO (e.g., MO1 or MO2 of FIG. 13) may be counted as 1 and the number of BD (or BD complexity) for a case of performing decoding by combining PDCCH candidates across a plurality of MOs may be counted as x. For example, x=1 may be configured, but by considering that computational complexity of a combined decoding method is higher than an individual (or non-combined) decoding method, a value of x may be counted as greater than 1 (e.g., 1.1, 1.2, 1.3, . . . , hereinafter, x is 1.y). In this case, according to terminal implementation, the number of BD (or BD complexity) may be counted at each MO in the following various ways.

Embodiment 5-1

A terminal may perform individual decoding BD once for each PDCCH candidate at each MO and perform combined decoding BD once for each PDCCH candidate across two MOs (e.g., refer to an example of FIG. 13).

Figure 17:
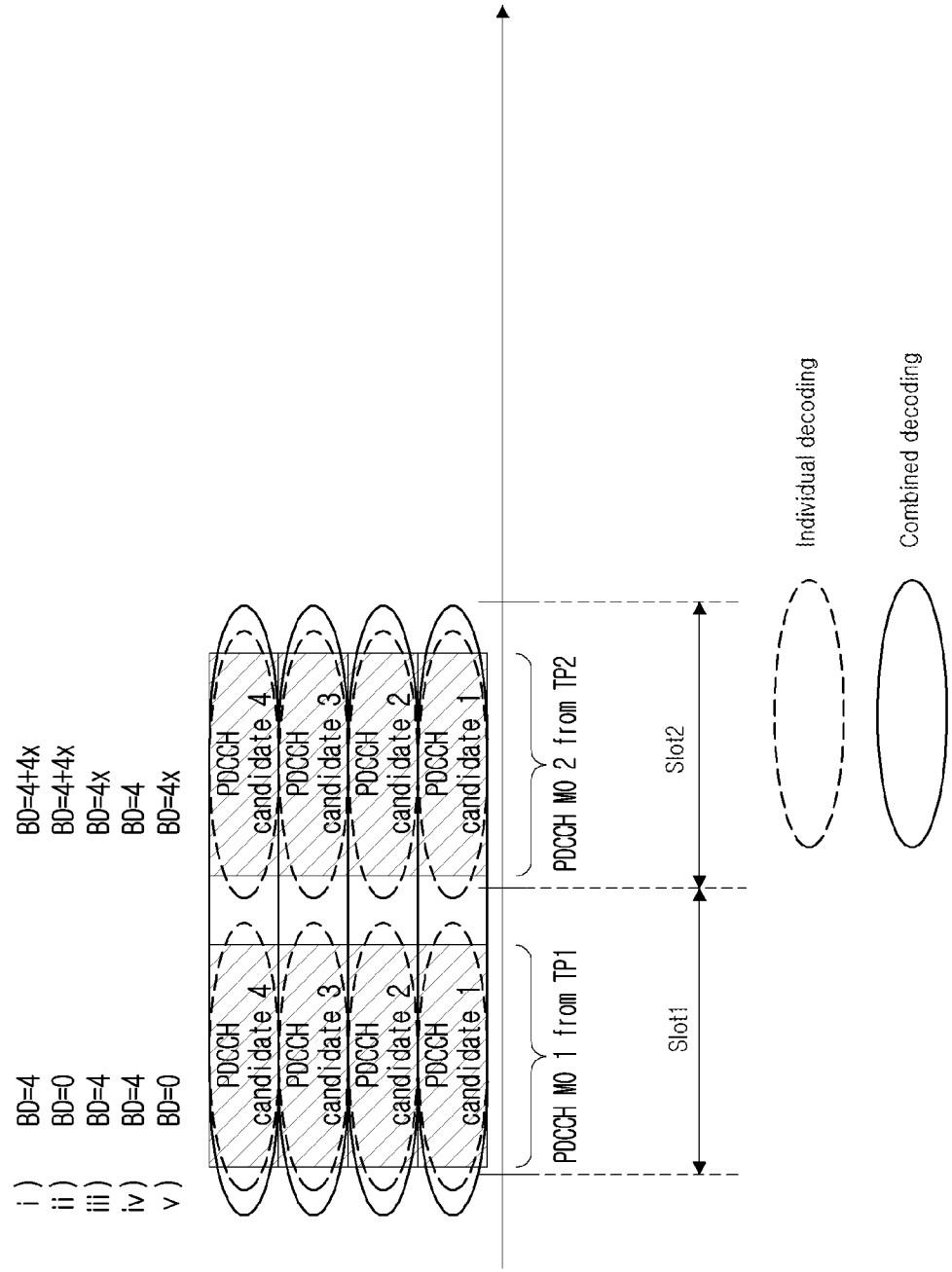

As a result, 4 individual decoding BD may be performed for PDCCH candidate 1, 2, 3 and 4 at MO1 and 4 individual decoding BD may be performed for PDCCH candidate 1, 2, 3 and 4 at MO2. In addition, 4 combined decoding BD may be performed for PDCCH candidate 1, 2, 3 and 4 at MO2. Accordingly, the number of BD (or BD complexity) may be counted as 4+4+4x at both MO1 and MO2 (an example i) of FIG. 17).

Embodiment 5-2

A terminal may perform individual decoding BD once for each PDCCH candidate at a specific MO of 2 MOs (e.g., MO1 or MO2) and perform combined decoding BD once for each PDCCH candidate across two MOs (e.g., refer to an example of FIG. 14 or FIG. 15).

As a result, 4 individual decoding BD may be performed for PDCCH candidate 1, 2, 3 and 4 at MO1 and 4 combined decoding BD may be performed for PDCCH candidate 1, 2, 3 and 4 at MO2. Accordingly, the number of BD (or BD complexity) may be counted as 4+4x at both MO1 and MO2 (an example ii) of FIG. 17).

Alternatively, 4 individual decoding BD may be performed for PDCCH candidate 1, 2, 3 and 4 at MO2 and 4 combined decoding BD may be performed for PDCCH candidate 1, 2, 3 and 4 at MO2. Accordingly, the number of BD (or BD complexity) may be counted as 4+4x at both MO1 and MO2 (an example iii) of FIG. 17).

Embodiment 5-3

A terminal may perform individual decoding BD once for each PDCCH candidate at each MO (e.g., refer to an example of FIG. 9).

As a result, 4 individual decoding BD may be performed for PDCCH candidate 1, 2, 3 and 4 at MO1 and 4 individual decoding BD may be performed for PDCCH candidate 1, 2, 3 and 4 at MO2. Accordingly, the number of BD (or BD complexity) may be counted as 4+4 at both MO1 and MO2 (an example iv) of FIG. 17).

Embodiment 5-4

A terminal may perform combined decoding BD once for each PDCCH candidate across two MOs (e.g., refer to an example of FIG. 10 or FIG. 11).

As a result, 4 combined decoding BD may be performed for PDCCH candidate 1, 2, 3 and 4 at MO2. Accordingly, the number of BD (or BD complexity) may be counted as 4x at both MO1 and MO2 (an example v) of FIG. 17).

Among detailed examples of the above-described embodiment 5, embodiment 5-1 requires the most number of BD (or the highest BD complexity). If MO1 and MO2 exist in a different TU, when a BD limit is exceeded in any one TU (e.g., slot 1 where MO1 exists or slot 2 where MO2 exists), a terminal may determine a BD operation so that a BD limit will not be exceeded by applying other embodiment (e.g., embodiment 5-2/5-3/5-4) requiring the smaller number of BD (or lower BD complexity) in a corresponding TU.

For example, it may be assumed that SS set A, B, C, D are configured in one specific TU and their priority is SS set A>B>C>D. In addition, it may be assumed that SS set B and C are SS sets configured for MTRP PDCCH transmission (i.e., PDCCH repetition/division transmission) (e.g., it is assumed that MO1 corresponds to SS set A and MO2 corresponds to SS set C). In addition, it may be assumed that a BD limit in the one specific TU is 12.

If a BD counting method in embodiment 5-1 is assumed, a BD count value of SS set A, B, C, D is 4, 4, 4+4x, 4, respectively and the total BD count value in a corresponding TU is 16+4x, so PDCCH overbooking exceeding a BD limit may occur. In this case, SS set D with the lowest priority and SS set C with the next lowest priority may be dropped. But, when it is changed by a BD operation in embodiment 5-4 (or a BD counting method) for SS set B and C configured for MTRP PDCCH transmission, a BD count value for SS set A, B, C, D is 4, 0, 4x, 4, respectively and the total BD count value is 8+4x. If x=1 is assumed, none of SS set A, B, C, D may be dropped and all may be monitored.

If a BD counting method in embodiment 5-2 is assumed, a BD count value for SS set A, B, C, D is 4, 0, 4+4x, 4 (or 4, 4, 4x, 4), respectively and the total BD count value is 12+4x, so PDCCH overbooking exceeding a BD limit may occur. In this case, SS set D with the lowest priority may be dropped. But, when it is changed by a BD operation in embodiment 5-4 (or a BD counting method) for SS set B and C configured for MTRP PDCCH transmission, a BD count value for SS set A, B, C, D is 4, 0, 4x, 4, respectively and the total BD count value is 8+4x. If x=1 is assumed, none of SS set A, B, C, D may not be dropped and all may be monitored.

If a BD counting method in embodiment 5-3 is assumed, a BD count value for SS set A, B, C, D is 4, 4, 4, 4, respectively and the total BD count value is 16, so PDCCH overbooking exceeding a BD limit may occur. In this case, SS set D with the lowest priority may be dropped. But, when it is changed by a BD operation in embodiment 5-4 (or a BD counting method) for SS set B and C configured for MTRP PDCCH transmission, a BD count value for SS set A, B, C, D is 4, 0, 4x, 4, respectively and the total BD count value is 8+4x. If x=1 is assumed, none of SS set A, B, C, D may be dropped and all may be monitored.

Similarly, when a BD limit is exceeded (i.e., PDCCH overbooking) in a TU where there is a SS set/MO configured for MTRP PDCCH transmission (i.e., PDCCH repetition/ division transmission), for a SS set/MO configured for repetition/division transmission, a BD operation (or a BD counting method) requiring the relatively large number of BD (or relatively high BD complexity) may be applied by being changed into a BD operation (or a BD counting method) requiring the relatively small number of BD (or relatively low BD complexity). A proper BD operation (or a BD counting method) which maximizes PDCCH reliability while monitoring as many SS sets as possible in a corresponding TU (i.e., minimizing SS set drop) may be applied.

In other words, when PDCCH overbooking does not occur, reliability improvement through PDCCH repetition/ division transmission may be maximized by applying an embodiment with high BD complexity. If PDCCH overbooking occurs, SS set drop may be reduced or minimized by applying an embodiment with low BD complexity.

Alternatively, although it is not necessarily to minimize SS set drop and maximize PDCCH reliability, a specific BD method among a plurality of BD operation (or BD counting method) candidates may be applied.

In addition, a base station may indicate/configure to a terminal a specific (or optimum) BD operation/counting method among a plurality of BD operation (or BD counting method) candidates and a terminal may apply a specific (or optimum) BD operation/counting method among a plurality of BD operation (or BD counting method) candidates according to an indication/a configuration of a base station or even without an indication/a configuration of a base station. For example, a specific BD operation/counting method indicated/configured by a base station may be based on terminal capability information or may be randomly determined by a base station.

As an additional example, the number of BD (or BD complexity) for MTRP PDCCH transmission (i.e., PDCCH repetition/division transmission) may be generally larger (or higher) than the number of BD (or BD complexity) for STRP PDCCH transmission (i.e., PDCCH one-time transmission). In consideration of it, when a BD limit is exceeded in a TU where there are SS set (s) configured for MTRP PDCCH transmission (i.e., PDCCH repetition/division transmission), corresponding SS set (s) may be excluded (i.e., corresponding SS set (s) may be dropped) from monitoring (e.g., a priority of corresponding SS set (s) may be changed into the lowest priority). And, for the remaining SS set (s) excluding corresponding SS set (s) (i.e., other SS set (s) that MTRP PDCCH transmission (repetition/division transmission) is not configured), based on BD counting (i.e., BD counting assuming one-time transmission) and a priority, whether the total BD count value in a corresponding TU exceeds a BD limit may be determined again. Accordingly, unless a BD limit is exceeded, as many SS sets as possible may be monitored.

As an additional example, candidates of a BD operation (or a BD counting method) are not limited to the above-described embodiment 5-1 to 5-4 and one or more of all examples described in the present disclosure (i.e., the above-described embodiment 1 to 4, the after-mentioned embodiment 6 and 7 and their detailed examples) may become a candidate of various BD operations (or BD counting methods).

In addition, candidates of a BD operation (or a BD counting method) may be linked to a method of counting the number of CCEs for channel estimation.

For example, for a specific PDCCH candidate of a specific SS set/MO, the number of CCEs for channel estimation for a corresponding PDCCH candidate may be counted as 1 (e.g., assumed as AL=1) when it is assumed that both MTRP PDCCH transmission (or repetition/division transmission) and STRP PDCCH transmission (or one-time transmission) may be performed.

For example, for a specific PDCCH candidate of a specific SS set/MO, the number of CCEs may counted as 0 when it is assumed that neither combined decoding BD for MTRP PDCCH transmission nor STRP PDCCH transmission is performed.

For example, when channel estimation for PDCCH candidate (s) of other SS set/MO (s) is performed together in one specific PDCCH of one specific SS set/MO that combined decoding BD is performed when MTRP PDCCH transmission is performed across a plurality of SS sets/MOs, the number of CCEs in one specific PDCCH of the one specific SS set/MO may be counted by combining the number of CCEs of PDCCH candidate (s) of other SS set/MO (s).

Accordingly, when the number of CCEs in one specific TU exceeds a CCE limit, as many sets/MOs as possible may be monitored by applying a method with the smaller number of CCEs (or lower channel estimation complexity).

Embodiment 6

A base station may indicate/configure to a terminal multiple SS sets/MOs for MTRP PDCCH transmission (i.e., PDCCH repetition/division transmission). For example, SS set B and C of SS set A, B, C, D may be configured for MTRP PDCCH transmission and a base station may inform a terminal that SS set B and C are connected for MTRP PDCCH transmission. With it, a terminal may perform BD according to the above-described examples for a PDCCH candidate of a MO corresponding to SS set B (e.g., MO1) and a MO corresponding to SS set C (e.g., MO2).

Here, in determining whether a BD/CCE limit is exceeded in one specific TU, a terminal monitors some SS set (s) of SS sets connected for MTRP PDCCH transmission because they do not exceed a BD/CCE limit, but it may not monitor the remaining SS set (s) because they exceed a BD/CCE limit. In this case, the following examples may be applied.

Embodiment 6-1

A high priority may be configured for SS sets connected for MTRP PDCCH transmission. In other words, a BD/CCE resource may be allocated to a connected SS set in preference to an unconnected SS set.

For example, if it is assumed that a priority of each SS set which does not consider whether connection is performed for MTRP PDCCH transmission is A>B>C>D, a BD/CCE resource may be allocated to connected SS set B and C in preference to unconnected SS set A and D. In this case, although PDCCH overbooking occurs in a specific TU, SS sets connected for MTRP PDCCH transmission have a low probability of being dropped (i.e., have a high probability of being monitored), PDCCH reliability may be improved.

Embodiment 6-2

When even one of SS sets connected for MTRP PDCCH transmission is dropped (or excluded from monitoring), all connected SS sets may be dropped (or excluded from monitoring).

In other words, although only part of connected SS sets is monitored, it may be difficult to achieve PDCCH reliability improvement, a goal of MTRP PDCCH transmission (i.e., repetition/division transmission), so whether drop (or monitoring) is performed may be applied in a unit of a connected SS set.

Embodiment 7

When some SS set (s) of SS sets connected for MTRP PDCCH transmission (i.e., PDCCH repetition/division transmission) are excluded from monitoring, the number of BD/CCEs of the remaining SS set (s) to be monitored may be adjusted.

For example, under an assumption like embodiment 6, PDCCH overbooking occurs in a specific TU, so SS set B is not monitored, but SS set C may be monitored. In this case, the number of combined decoding BD for a PDCCH candidate for SS set B may be excluded from the number of BD/CCEs for SS set C. In addition, when channel estimation for a connected PDCCH candidate of SS set B is performed together in a specific PDCCH candidate of SS set C, the number of CCEs for a connected PDCCH candidate of SS set B may be excluded.

For example, in an example of FIG. 11, MO2 (or SS set C) is dropped (or excluded from monitoring) due to PDCCH overbooking in slot 2 where MO2 (or SS set C) exists, but MO1 (or SS set B) may not be dropped (or may be included in monitoring) because PDCCH overbooking does not occur in slot 1 where MO1 (or SS set B) exists. In this case, combined decoding BD using all PDCCH candidates of SS set B and C may not be performed, so it may be excluded when counting the number of BD/CCEs in SS set B (or MO1). For example, when PDCCH one-time transmission is not assumed as in an example of FIG. 11, a BD count value in SS set B (or MO1) may be 0 and a CCE count value may be also 0.

As an additional example, in an example of FIG. 11, MO1 (or SS set B) is dropped (or excluded from monitoring) due to PDCCH overbooking in slot 1 where MO1 (or SS set B) exists, but MO2 (or SS set C) may not be dropped (or may be included in monitoring) because PDCCH overbooking does not occur in slot 2 where MO2 (or SS set C) exists. In this case, combined decoding BD using all PDCCH candidates of SS set B and C may not be performed, so it may be excluded when counting the number of BD/CCEs in SS set C (or MO2). For example, when PDCCH one-time transmission is not assumed as in an example of FIG. 11, a BD count value in SS set C (or MO2) may be 0 and a CCE count value may be also 0.

As an additional example, an implementation method may be assumed that individual decoding based BD for one-time transmission per each candidate is performed 1 time in SS set B (or MO1) and combined decoding based BD for multi-time transmission per each candidate is performed x (i.e., 1.y) times in set C (or MO2). If SS set B is dropped and SS set C is not dropped, combined decoding based BD may not be performed in SS set C, so the number of BD of SS set C is 0. As a result, a PDCCH may not be transmitted and received through SS set B and C. In order to perform PDCCH transmission and reception even under this situation, the number of BD of SS set C is counted as 1, not 0 and UE may perform individual decoding based BD assuming one-time transmission for each candidate of SS set C, not combined decoding based BD in SS set C.

As in the embodiment 1-1 or 1-5, when the number of BD is 0 in MO 1 (or SS set B), whether UE will drop or perform PDCCH monitoring for corresponding MO 1 may be determined based on whether MO 2 (=SS set C) paired (or connected) for repetition/division transmission is monitored or dropped (i.e., if MO 2 is monitored, MO1 is also monitored and if MO 2 is dropped, MO1 is also dropped). In the proposal 1-1 or proposal 1-5, UE performs combined decoding based BD at MO 2 without performing BD at MO 1. As a result, combined decoding based BD may not be performed if SS set C of MO 2 is dropped, so UE does not monitor SS set B of MO 1. On the other hand, combined decoding based BD should be performed if SS set C of MO 2 is monitored, so UE monitors SS set B of MO 1. Accordingly, whether MO 2 (or SS set C) is monitored/dropped may determine whether MO 1 is monitored/dropped. As such, when a plurality of SS sets paired (or connected) for repetition/division transmission are configured, one SS set of a plurality of SS sets may be configured as a reference set which determines whether the remaining SS set (s) are monitored/dropped.

In other words, based on whether a SS set corresponding to a reference set among a plurality of SS sets that PDCCH multi-time (i.e., transmission/division) transmission is configured is monitored/dropped in a specific TU, whether the remaining SS sets are monitored/dropped may be determined. For example, the remaining SS set (s) are monitored/dropped may be determined according to whether the reference set is monitored/dropped, not by whether the remaining SS set (s) are monitored/dropped in each TU where the remaining SS set (s) exist.

A reference set may be preconfigured or predefined as specific one (e.g., having the highest index, or being latest in a time domain, etc.) of a plurality of SS sets associated with multiple (e.g., repetition/division) transmission.

As an additional example, in the example, the number of BD for combined decoding based BD is configured as 0 in SS set B and the number of BD for combined decoding based BD is configured as x (i.e., 1.y) per each PDCCH candidate in SS set C. In this case, when SS set B is dropped and SS set C is monitored, the number of BD of SS set C may be changed. For example, when whether SS set C is monitored is connected to whether paired/connected SS set B is monitored, the number of combined decoding based BD per PDCCH candidate for SS set C may be changed from x to 0 if SS set B is dropped. Alternatively, when individual decoding based BD assuming one-time transmission, not combined decoding based BD, is performed in SS set C if SS set B is dropped, the number of combined decoding based BD per PDCCH candidate for SS set C may be changed from x to 1. In other words, when the number of BD/BD complexity in other SS set is changed according to whether some SS sets are dropped among a plurality of paired/connected SS sets, it may be difficult to clearly define a terminal operation. To prevent it, a priority of SS set B may be configured to be higher than SS set C.

For example, basically, for a priority between SS sets, a SS set having a low SS set index may be defined to have a higher priority than a SS set having a high SS set index (i.e., a SS set having a low priority may be dropped in a time unit that PDCCH overbooking occurs). To prevent the above-described problem, it may be configured to prevent a case in which Set B is dropped and Set C is monitored by configuring a SS set index of SS set B to be lower than SS set C. As such, when BD is applied by combining PDCCH candidates of a plurality of SS sets/MOs, a SS set/MO that combined decoding based BD is performed (i.e., the number of combined decoding based BD is counted) may be configured to have a lower priority (or a higher SS set index) than the remaining SS sets/MOs. Alternatively, when BD is applied by combining PDCCH candidates of a plurality of SS sets/MOs, combined decoding based BD may be configured to be performed in a SS set/MO having the lowest priority (or the highest SS set index). Accordingly, UE, for a plurality of SS sets/MOs configured for repetition/division transmission, may expect that a relatively low index (i.e., a high priority) is configured for a SS set/MO that the number of BD for combined decoding based BD is configured as 0 and may expect that a relatively high index (i.e., a low priority) is configured for a SS set that the number of BD for combined decoding based BD is configured as x per each PDCCH candidate.

As an additional example, a case may occur in which the number of BD or the number of CCEs which may be calculated by UE in a specific time unit (e.g., 1 slot) is exceeded to drop some SS sets of SS sets configured in that time unit. In this case, for a plurality of SS sets configured for PDCCH repetition/division transmission in a corresponding time unit, UE may assume a specific SS set (e.g., a SS set with the lowest index or the highest index) as a representative/reference SS set and may assume the sum of the number of BD or the number of CCEs for a plurality of SS sets as the number of BD or the number of CCEs of the representative/reference SS set. When whether drop/monitoring is performed is determined by comparing a priority of the remaining other SS sets configured in the same time unit (e.g., one or more other SS sets that one-time transmission is assumed or repetition/division transmission is not assumed) and the plurality of SS sets configured for PDCCH repetition/division transmission, UE may compare a priority with the remaining other SS sets based on one representative/reference SS set for the plurality of SS sets configured for PDCCH repetition/division transmission. For example, if SS set B and C are configured for PDCCH repetition/division transmission when SS set A, B, C, D are configured in one time unit, an index of a representative/reference SS set for SS set B and C may be configured as B and the number of BD/CCEs of a representative/reference SS set may be assumed as the sum of the number of BD/CCEs of SS set B and C. Accordingly, a terminal may determine whether drop/monitoring for each SS set is performed based on a priority between SS set A, SS set B (which is a representative/reference SS set of SS set B and C), and SS set 4. If a representative/reference SS set is dropped, both SS set B and C associated with a representative/reference SS set may be dropped and if a representative/reference SS set is monitored, both SS set B and C associated with a representative/reference SS set may be monitored. Through it, a plurality of SS sets configured for PDCCH repetition/division transmission may be dropped/monitored at the same time and a case in which only one of two is dropped/monitored may not occur.

For the above-described examples, a base station may select which embodiment is used for a terminal to operate with a BD operation (or a BD/CCE counting method) and indicate/configure it to a terminal. Alternatively, terminal implementation complexity is different according to each embodiment, so a terminal may report which BD operation (or BD/CCE counting method) candidate (s) it may support according to which embodiment to a base station as terminal capability information. A base station may configure/indicate a BD operation (or a BD/CCE counting method) to a terminal based on terminal capability information and accordingly, may perform one or more of PDCCH repetition/division transmission or one-time transmission.

In addition, the present disclosure mainly describes a case in which the same PDCCH/DCI is repetitively transmitted when a PDCCH is transmitted multiple times across a plurality of SS sets/MOs, but the same examples may be applied even when the same PDCCH/DCI is partitively transmitted.

In addition, the present disclosure mainly describes examples in which the same PDCCH is repeated/partitioned two times (i.e., across two MOs/SS sets), but even when repetition/division transmission is performed N times (N is equal to or greater than 3), the same examples may be applied even when one BD is performed by a combined decoding method after receiving all PDCCHs which are repetitively/partitively transmitted N times.

In addition, in the present disclosure, MO1 and MO2 may be configured in one SS set and may be configured in a different SS set. When a plurality of MOs are configured in the same SS set, it may be configured/indicated from a base station that corresponding MOs are connected for PDCCH repetition/division transmission. When a plurality of MOs are configured in a different SS set, it may be configured/indicated from a base station that corresponding SS sets are connected for PDCCH repetition/division transmission.

In addition, the present disclosure mainly describes an example in which a PDCCH is TDM-ed and repetitively/partitively transmitted in a different time resource, but the same examples may be applied even when a PDCCH is FDM-ed and repetitively/partitively transmitted in a different frequency resource (e.g., RE/REG/REG bundle/CCE or any REG set). In this case, MO1 and MO2 may be substituted with CORESET 1 (e.g., a CORESET that a DL RS of TP1 is configured as a QCL RS) and CORESET 2 (e.g., a CORESET that a DL RS of TP2 is configured as a QCL RS) respectively in a drawing to which examples of the present disclosure refer. Alternatively, MO1 and MO2 may be also substituted with frequency resource set 1 used by TP1 for PDCCH transmission and frequency resource set 2 used by TP2 for PDCCH transmission, respectively. In addition, resources that PDCCH repetition/division transmission is performed may be multiplexed by a TDM and FDM method. In other words, in examples of the present disclosure, a MO may refer to a resource distinguished from any one of a time/frequency resource.

In addition, in the present disclosure, PDCCH one-time transmission may mean the existing (STRP) PDCCH transmission method (e.g., of a system before 3GPP NR release-16), not MTRP PDCCH transmission.

Figure 18:
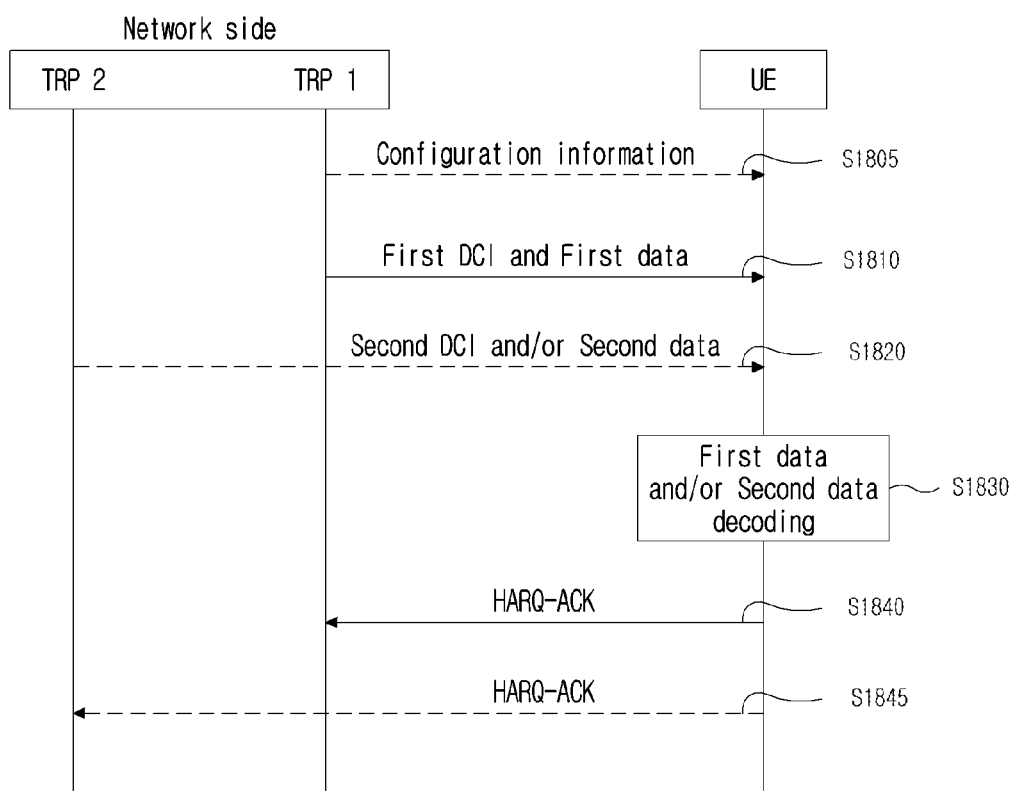
FIG. 18 is a diagram for describing a signaling procedure of a network side and a terminal according to the present disclosure.

FIG. 18 is a diagram for describing a signaling procedure of a network side and a terminal according to the present disclosure.

FIG. 18 represents signaling between a network side (e.g., a first TRP and a second TRP) and a terminal (UE) under a situation of a plurality of TRPS to which various examples of the present disclosure (e.g., embodiment 1/2/3/4/5/6/7 and/or detailed examples thereof) may be applied (in the following description, a TRP may be replaced with a base station and a cell). Here, UE/a Network side is just an example and may be applied by being replaced with a variety of devices as described in relation to the above-described description or FIG. 19. FIG. 18 is just for convenience of a description, and does not limit a scope of the present disclosure. In addition, some step (s) shown in FIG. 18 may be omitted according to a situation and/or a configuration, etc.

In reference to FIG. 18, signaling between 2 TRPs and UE is considered for convenience of a description, but it goes without saying that a corresponding signaling method may be extended and applied to signaling between multiple TRPs and multiple UE. In the following description, a Network side may be one base station including a plurality of TRPs and may be one cell including a plurality of TRPs. In an example, an ideal/non-ideal backhaul may be configured between a first TRP and a second TRP configuring a network side. In addition, the following description is described based on multiple TRPs, but it may be equally extended and applied to transmission through multiple panels. In addition, in the present disclosure, an operation that a terminal receives a signal from a first TRP and/or a second TRP may include an operation that a terminal receives a signal from a network side (through/with a first TRP and/or a second TRP) and an operation that a terminal transmits a signal to a first TRP and/or a second TRP may include an operation that a terminal transmits a signal to a network side (through/with a first TRP and/or a second TRP).

In addition, as described above, a TRP may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., an index, an ID). In an example, when one terminal is configured to perform transmission and reception with multiple TRPs (or cells), it may mean that multiple CORESET groups (or CORESET pools) are configured for one terminal. Such a configuration on a CORESET group (or a CORESET pool) may be performed through higher layer signaling (e.g., RRC signaling, etc.). In addition, a base station may generally mean an object which performs transmission and reception of data with a terminal. For example, the base station may be a concept which includes one or more TPs (Transmission Point), one or more TRPs (Transmission and Reception Point), etc. In addition, a TP and/or a TRP may also include a panel, a transmission and reception unit, etc. of a base station.

An example of FIG. 18 represents signaling for a case in which a terminal receives multiple DCI under a situation of M-TRPs (or it may be assumed as M-TRPs even when a plurality of CORESETs or CORESET groups are configured from one TRP) (e.g., when each TRP repetitively transmits the same DCI (or partitively the same DCI) to UE).

UE may receive configuration information on multiple TRP based transmission and reception through/with TRP 1 (and/or TRP 2) from a Network side S1805. The configuration information may include information related to a configuration of a network side (i.e., a TRP configuration), resource information related to multiple TRP based transmission and reception (resource allocation), etc. In this case, the configuration information may be transmitted through higher layer signaling (e.g., RRC signaling, MAC-CE, etc.). In addition, when the configuration information is predefined or preconfigured, a corresponding step may be omitted.

For example, the configuration information, as described in the above-described examples (e.g., embodiment 1/2/3/4/5/6/7 and/or their detailed examples), may include CORESET related configuration/CCE configuration information/search space related information/repetition transmission related information of a control channel (e.g., a PDCCH) (e.g., whether of repetition transmission/the number of repetition transmission, etc.)/collision of a resource related to a control channel (e.g., a PDCCH)/information associated with overbooking/a blind detection related configuration, etc.

For example, an operation that UE in the above-described step S1805 (100/200 in FIG. 19) receives configuration information related to the multiple TRP-based transmission and reception from a network side (200/100 in FIG. 19) may be implemented by a device in FIG. 22 which will be described below. For example, in reference to FIG. 19, one or more processors 102 may control one or more transceivers 106 and/or one or more memories 104, etc. to receive configuration information related to the multiple TRP-based transmission and reception and one or more transceivers 106 may receive configuration information related to the multiple TRP-based transmission and reception from a network side.

UE may receive first DCI and first data scheduled by first DCI through/with TRP 1 from a network side S1810. In addition, UE may receive second DCI and second data scheduled by second DCI through/with TRP 2 from a network side or may receive second data scheduled by first DCI without second DCI or may receive only second DCI scheduling first data S1820. For example, data of a single TRP (e.g., first date of TRP 1, or second data of TRP 2) may be scheduled by first DCI and second DCI repetitively transmitted from TRP 1 and TRP 2.

For example, first DCI (and second DCI) may include (indication) information on a TCI state/resource allocation information on a DMRS and/or data (i.e., a space/frequency/time resource)/blind detection related information/information related to repetition transmission, etc. described in the above-described examples (e.g., embodiment 1/2/3/4/5/6/7 and/or their detailed examples). For example, the blind detection related information may include information related to the number of repetitions of blind detection by considering a BD/CCE related threshold value (e.g., a limit)/a case in which a PDCCH is repetitively transmitted. For example, the information related to repetition transmission may include whether DCI is repetitively transmitted/the number of repetitions/whether one-time transmission is performed, etc. In addition, DCI (e.g., first DCI (and second DCI)) and Data (e.g., Data 1 and Data 2) may be transmitted through a control channel (e.g., a PDCCH, etc.) and a data channel (e.g., a PDSCH, etc.), respectively. In addition, S1810 and S1820 may be performed simultaneously or any one may be performed earlier than the other.

For example, TRP1 and/or TRP2 may repetitively/partitively transmit the same DCI. In one example, a PDCCH candidate for each TRP that the DCI is transmitted may correspond to a different TCI state. In other words, a control channel (e.g., a PDCCH) that DCI is transmitted may be repetitively transmitted based on a TDM/FDM/SDM method or the same control channel may be partitively transmitted. For example, a DCI format which may be transmitted per each TRP may be equally configured or differently configured, respectively.

For example, an operation that UE in Step 1810 and Step 1820 (100/200 of FIG. 19) receives DCI (e.g., first DCI and/or second DCI) and/or data (e.g., first data and/or second data) from a network side (200/100 of FIG. 19) may be implemented by a device in FIG. 19 which will be described below. For example, in reference to FIG. 2, one or more processors 102 may control one or more transceivers 106 and/or one or more memories 104, etc. to receive DCI (e.g., first DCI and/or second DCI) and/or data (e.g., first data and/or second data) and one or more transceivers 106 may receive DCI (e.g., first DCI and/or second DCI) and/or data (e.g., first data and/or second data) from a network side.

UE may decode received data (e.g., first data and/or second data) through/with TRP 1 (and/or TRP 2) from a network side S1830. For example, UE may perform channel estimation and/or blind detection and/or data decoding based on the above-described examples (e.g., embodiment 1/2/3/4/5/6/7 and their detailed examples).

For example, UE may perform decoding based on the number of BD/CCEs configured for PDCCH monitoring. For example, the number of BD/CCEs may be determined based on the above-described examples (e.g., embodiment 1/2/3/4/5/6/7 and their detailed examples). For example, if the same PDCCH is repetitively transmitted through a plurality of PDCCH candidates belonging to a different MO (monitoring occasion), BD may be performed one time after a PDCCH is received at a last MO. For example, a PDCCH candidate which is repetitively transmitted to one search space set and a PDCCH candidate which is transmitted 1 time may be configured together and BD may be performed in each PDCCH candidate. For example, a specific PDCCH candidate may be configured to be used for both repetition transmission and one-time transmission, and at a MO performing BD for repetition transmission, it may be configured that BD for one-time transmission is not performed or only a PDCCH candidate corresponding to a last MO may perform one-time transmission. For example, a BD operation (e.g., BD for a multi-time transmission PDCCH/BD for a one-time transmission PDCCH) may be determined based on whether a PDCCH candidate may perform self-decoding.

For example, an operation that UE in step S1830 (100/200 of FIG. 19) decodes first data and/or second data may be implemented by a device in FIG. 19 which will be described below. For example, in reference to FIG. 19, one or more processors 102 may control one or more memories 104, etc. to perform an operation of decoding first data and/or second data.

UE may transmit HARQ-ACK information on first data and/or second data (e.g., ACK information, NACK information, etc.) to a network side through/with TRP 1 and/or TRP 2 S1840 and S1845. In this case, HARQ-ACK information on each of first data or second data may be transmitted to each TRP. In addition, HARQ-ACK information on first data and second data may be combined into one. In addition, UE may be configured to transmit only HARQ-ACK information to a representative TRP (e.g., TRP 1) and HARQ-ACK information transmission to other TRP (e.g., TRP 2) may be omitted.

For example, an operation that UE in Step S1840/S1850 (100/200 of FIG. 19) transmits HARQ-ACK information on first data and/or second data from a network side (200/100 of FIG. 19) may be implemented by a device in FIG. 19 which will be described below. For example, in reference to FIG. 19, one or more processors 102 may control one or more transceivers 106 and/or one or more memories 104, etc. to transmit HARQ-ACK information on first data and/or second data and one or more transceivers 106 may transmit HARQ-ACK information on first data and/or second data to a network side.

An example of FIG. 18 may be also applied to a multi DCI based M-TRP operation as well as a single DCI based M-TRP operation.

The above-described network side/UE signaling and operation may be implemented by a device which will be described below (e.g., a device in FIG. 19). For example, a network side (e.g., TRP 1/TRP 2) may correspond to a first wireless device and UE may correspond to a second wireless device and in some cases, the opposite may be considered.

Figure 19:
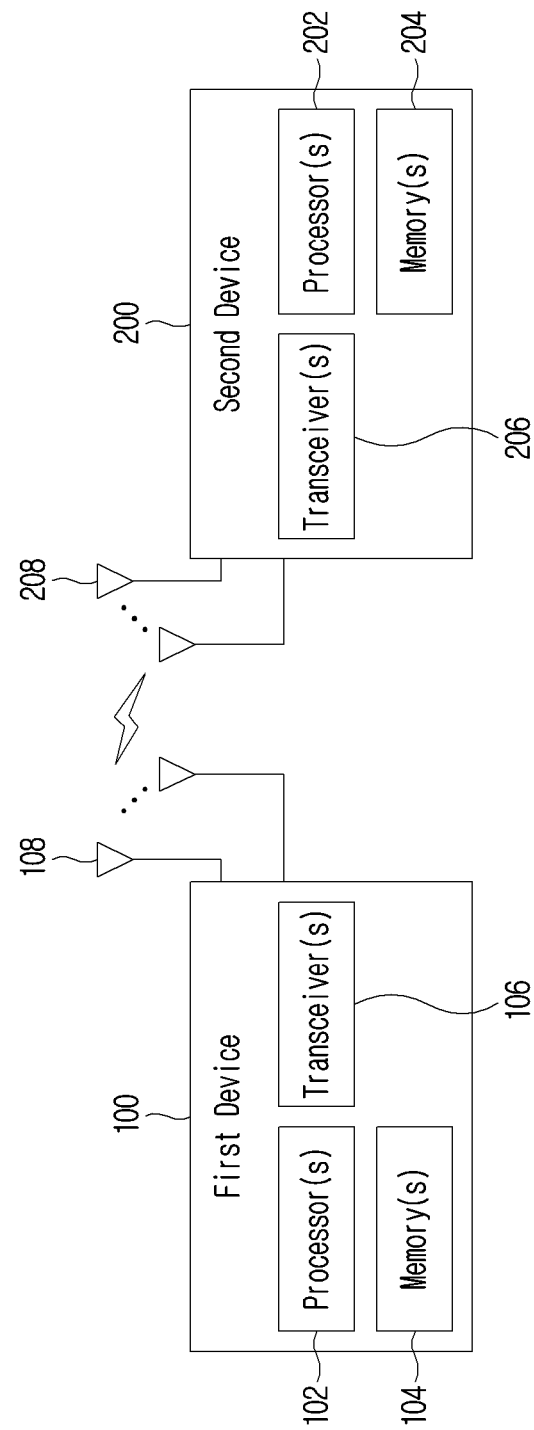
FIG. 19 illustrates a block diagram of a wireless communication system according to an embodiment of the present disclosure.

For example, the above-described network side/UE signaling and operation may be processed by one or more processors (e.g., 102, 202) in FIG. 19 and the above-described network side/UE signaling and operation may be stored in a memory (e.g., one or more memories in FIG. 19 (e.g., 104, 204)) in a form of a command/a program (e.g., an instruction, an executable code) for operating at least one processor in FIG. 19 (e.g., 102, 202).

General Device to which the Present Disclosure May be Applied

FIG. 19 is a diagram which illustrates a block diagram of a wireless communication system according to an embodiment of the present disclosure.

In reference to FIG. 19, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206.

One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor (s). A memory or alternatively, nonvolatile memory device (s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:
1. A method comprising:
transmitting, by a terminal to a base station, capability information for a number of blind detections related to counting PDCCH physical downlink control channel (PDCCH) candidates;
receiving, by the terminal from the base station, first configuration information for a monitoring scheme, and second configuration information for a first search space (SS) set and a second SS set related to PDCCH repetition; and
performing, by the terminal, monitoring and decoding for the PDCCH candidates, based on the first configuration information, the second configuration information, and the capability information,
wherein each PDCCH candidate in a first monitoring occasion of the first SS set is counted as one, and each PDCCH candidate in a second monitoring occasion of the second SS set is counted as two.
2. The method according to claim 1, wherein:
a number of monitored PDCCH candidates is equal to or less than a predetermined upper limit.

3. The method according to claim 1, wherein:
the PDCCH candidates for a downlink control information (DCI) format with same information are monitored in the first SS set and the second SS set.

4. The method according to claim 1, wherein:
the second monitoring occasion or the second SS set is later in time domain than the first monitoring occasion or the first SS set.

5. A processing unit comprising:
at least one processor; and
at least one computer memory which is operably connected to the at least one processor and stores instructions performing the method according to claim 1.

6. At least one non-transitory computer readable medium storing at least one instruction, wherein:
the at least one instruction controls a device to perform the method according to claim 1 by being executed by at least one processor.

7. A terminal comprising:
at least one transceiver; and
at least one processor connected to the at least one transceiver,
wherein the at least one processor is configured to:
transmit, to a base station through the at least one transceiver, capability information for a number of blind detections related to counting physical downlink control channel (PDCCH) candidates;
receive, from the base station through the at least one transceiver, first configuration information for a monitoring scheme, and second configuration information for a first search space (SS) set and a second SS set related to PDCCH repetition; and
perform monitoring and decoding for the PDCCH candidates, based on the first configuration information, the second configuration information, and the capability information,
wherein each PDCCH candidate in a first monitoring occasion of the first SS set is counted as one, and each PDCCH candidate in a second monitoring occasion of the second SS set is counted as two.

8. A method comprising:
receiving, by a base station from a terminal, capability information for a number of blind detections related to counting physical downlink control channel (PDCCH) candidates;
transmitting, by the base station to the terminal, first configuration information for a monitoring scheme, and second configuration information for a first search space (SS) set and a second SS set related to PDCCH repetition; and
transmitting, by the base station, the PDCCH to the terminal, based on the first configuration information, the second configuration information, and the capability information,
wherein each PDCCH candidate in a first monitoring occasion of the first SS set is counted as one, and each PDCCH candidate in a second monitoring occasion of the second SS set is counted as two.

9. A base station comprising:
at least one transceiver; and
at least one processor connected to the at least one transceiver,
wherein the at least one processor is configured to:
receive, from a terminal through the at least one transceiver, capability information for a number of blind detections related to counting physical downlink control channel (PDCCH) candidates;
transmit, to the terminal through the at least one transceiver, first configuration information for a monitoring scheme, and second configuration information for a first search space (SS) set and a second SS set related to PDCCH repetition; and
transmit the PDCCH to the terminal through the at least one transceiver, based on the first configuration information, the second configuration information, and the capability information,
wherein each PDCCH candidate in a first monitoring occasion of the first SS set is counted as one, and each PDCCH candidate in a second monitoring occasion of the second SS set is counted as two.

* * * * *